US006815075B2

(12) United States Patent
Kasai et al.

(10) Patent No.: US 6,815,075 B2
(45) Date of Patent: Nov. 9, 2004

(54) LITHOGRAPHIC PRINTING PLATE PRECURSOR

(75) Inventors: Seishi Kasai, Haibara-gun (JP); Sumiaki Yamasaki, Haibara-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 57 days.

(21) Appl. No.: 10/269,938

(22) Filed: Oct. 15, 2002

(65) Prior Publication Data

US 2003/0138713 A1 Jul. 24, 2003

(30) Foreign Application Priority Data

Oct. 15, 2001 (JP) .................................... P. 2001-317102
Oct. 15, 2001 (JP) .................................... P. 2001-317103

(51) Int. Cl.[7] .................................................. B32B 9/04
(52) U.S. Cl. ....................... 428/447; 524/543; 524/556; 524/557; 528/376; 525/55
(58) Field of Search .......................... 428/447; 524/543, 524/556, 557; 528/376; 525/55

(56) References Cited

U.S. PATENT DOCUMENTS 5,254,421 A 10/1993 Coppens et al.
5,294,507 A * 3/1994 Kato et al. ..................... 430/49
6,025,100 A 2/2000 Verschueren et al.

* cited by examiner

*Primary Examiner*—Kuo-Liang Peng
(74) *Attorney, Agent, or Firm*—Sughrue Mion, PLLC

(57) ABSTRACT

A lithographic printing plate precursor comprising an image receiving layer and a waterproof substrate, wherein the image receiving layer comprises: needle filler particles or porous filler particles; and a binder resin comprising a complex of: a resin comprising at least one of a metal atom and a semimetal atom, each of the at least one of a metal atom and a semimetal atom being bonded to an oxygen atom; with a polymer compound represented by the following formula (I):

(I)

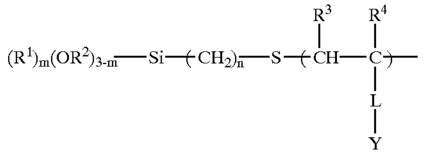

wherein $R^1$, $R^2$, $R^3$ and $R^4$ each independently represent a hydrogen atom or a hydrocarbon group having 1 to 8 carbon atoms; m is 0, 1 or 2; n is an integer of from 1 to 8; L represents a single bond or an organic linking group; and Y represents —$NHCOR^5$, —$CONH_2$, —$CON(R^5)_2$, —$COR^5$, —OH, —$CO_2M$ or —$SO_3M$ wherein $R^5$ represents alkyl group having 1 to 8 carbon atoms, and M represents a hydrogen atom, an alkali metal, alkaline earth metal or an onium.

10 Claims, 2 Drawing Sheets

LITHOGRAPHIC PRINTING PLATE PRECURSOR

FIELD OF THE INVENTION

This invention relates to a lithographic printing plate precursor. More specifically, it relates to a lithographic printing plate precursor providing a lithographic plate whereby a large number of copies having clear images without any background stain can be obtained in multiset printing, in particular, a lithographic printing plate precursor of direct draw type.

BACKGROUND OF THE INVENTION

Examples of lithographic printing plate precursor employed today mainly in the field of rough printing include (1) a printing plate precursor having a hydrophilic image receiving layer formed on a waterproof substrate; (2) a printing plate prepared by using a printing plate precursor having a (lipophilic) image receiving layer containing zinc oxide on a waterproof substrate, making a plate by directly drawing an image thereon and then treating the non-image part with a solution of making oil-insensitive; (3) a printing plate prepared by using, as a printing plate precursor, an electron photographic sensitive material having a photoconductive layer containing photoconductive zinc oxide on a waterproof substrate, forming an image thereon and then treating the non-image part with a solution of making oil-insensitive; (4) a printing plate precursor of silver photography type having a silver halide emulsion layer formed on a waterproof substrate, etc.

With the recent development of office instruments and advances in office automation, it has been required in the field of printing to develop an offset lithography system whereby a printing plate can be directly formed by the plate-making (i.e., image-forming) procedure using a lithographic printing plate precursor as described in the above (1) with various printers such as an electron photographic printer, a thermal transfer printer or an inkjet printer without resort to any specific treatment for making a printing plate.

Conventional lithographic printing plate precursors have surface layers serving as an image receiving layer on both faces of a substrate (paper, etc.) mediated by back face layers and intermediate layers. The back face layers or the intermediate layers are made up of a water soluble resin such as PVA or starch, a water dispersible resin such as a synthetic resin emulsion and a pigment. The image receiving layers are usually made up of an inorganic filler, a water soluble resin and a waterproofing agent.

Examples of the inorganic pigment include kaolin, clay, talc, calcium carbonate, silica, titanium oxide, zinc oxide, barium sulfate and alumina.

Examples of the water soluble resin include polyvinyl alcohol (PVA), modified PVA such as carboxy PVA, starch and its derivatives, cellulose derivatives such as carboxymethylcellulose and hydroxyethylcellulose, casein, gelatin, polyvinylpyrrolidone, vinyl acetate-crotonic acid copolymer and styrene-maleic acid copolymer.

Examples of the waterproofing agent include glyoxal, aminoplast precondensates such as melamine formaldehyde resin and urea formaldehyde resin, modified polyamide resins such as methylol polyamide resin, polyamide/polyamine/epichlorohydrin adduct, polyamide epichlorohydrin resin and modified polyamide polyimide resin.

In addition, it is known that crosslinking catalysts such as ammonium chloride and silane coupling agents can be used together with these components.

Studies have been further made to improve the hydrophilicity of non-image parts, enhance the film strength of the image receiving layer and improve the printing tolerance by using, as a binder to be used in the image receiving layer of lithographic printing plate precursor, a preliminarily crosslinked resin having a functional group capable of providing a carboxyl, hydroxyl, thiol, amino, sulfo or phosphono group upon decomposition and another functional group hardening upon exposure to heat/light (Japanese Patent Laid-Open No. 226394/1989, Japanese Patent Laid-Open No. 269593/1989 and Japanese Patent Laid-Open No. 288488/1989), a combination of a resin containing the above-described functional group and a heat/light-hardening resin (Japanese Patent Laid-Open No. 266546/1989, Japanese Patent Laid-Open No. 275191/1989 and Japanese Patent Laid-Open No. 309068/1989), or a combination of a resin containing the above-described functional group with a crosslinking agent (Japanese Patent Laid-Open No. 267093/1989, Japanese Patent Laid-Open No. 271292/1989 and Japanese Patent Laid-Open No. 309067/1989).

Also, studies have been made to improve the hydrophilicity of non-image parts by using, together with an inorganic filler and a binder in the image receiving layer, resin particles containing a hydrophilic group such as a phosphono group and having a small particle diameter of 1 μm or less (Japanese Patent Laid-Open No. 201387/1992 and Japanese Patent Laid-Open No. 223196/1992) or resin particles containing a functional group capable of providing such a hydrophilic group as described above upon decomposition and having a small particle diameter (Japanese Patent Laid-Open No. 319491/1992, Japanese Patent Laid-Open No. 353495/1992, Japanese Patent Laid-Open No. 119545/1993, Japanese Patent Laid-Open No. 58071/1993 and Japanese Patent Laid-Open No. 69684/1993).

However, the conventional printing plates thus obtained suffer from a problem. That is to say, in case of adding a waterproofing agent in an increased amount to improve the printing durability or using a waterproof resin to elevate the hydrophobicity, the printing tolerance can be improved but the hydrophilicity is worsened thereby causing printing stains, or in case of improving the hydrophilicity, the printing tolerance is worsened.

Under working conditions at a high temperature of 30° C. or above, in particular, there arises a problem that the surface layer is dissolved in dampening water employed in offset printing, which causes worsening in the printing tolerance, occurrence of printing stains, etc. Concerning a lithographic printing plate precursor of direct draw type wherein an image is drawn on the image receiving layer with the use of an oil-base ink etc., there still remains an unsolved problem. Namely, when the adhesiveness between the image receiving layer of the printing plate precursor and the oil-base ink is insufficient, drop-off of the oil-base ink arises in the step of printing and thus the printing tolerance is lowered even though the non-image parts have a sufficient hydrophilicity and thus causes no printing stain as described above.

On the other hand, there has been known a plate having as the image receiving layer a hydrophilic layer containing titanium oxide, polyvinyl alcohol and hydrolyzed tetramethoxysilane or tetraethoxysilane (Japanese Patent Laid-Open No. 42679/1991, Japanese Patent Laid-Open No. 268583/1998, etc.). When this plate is employed as a printing plate in practice, however, the obtained image shows only an insufficient printing durability.

SUMMARY OF THE INVENTION

As discussed above, it has been understood that the hydrophilicity of the image receiving layer can be enhanced by elevating the moisture retention in the image receiving layer. In the conventional image receiving layers, however, an increase in the moisture retention brings about some problems such that the swelling properties of a film are enlarged and thus the film structure is weakened or the film strength is lowered, or the adhesiveness between the substrate and the image receiving layer is worsened.

The present invention aims at solving the above-described problems encountering in the conventional lithographic printing plate precursor.

Accordingly, it is an object of the present invention to provide a lithographic printing plate precursor which is excellent as an offset printing plate free from not only uniform background stains but also spotty stains.

It is another object of the present invention to provide a lithographic printing plate precursor capable of providing a printing plate whereby a large number of copies having a clear image without any drop-off, distortion, etc. can be obtained.

The above-described object can be achieved by the following constitutions (items 1 to 10).

1. A lithographic printing plate precursor comprising an image receiving layer and a waterproof substrate, wherein the image receiving layer comprises:

needle filler particles; and a binder resin comprising a complex of: a resin comprising a bond whereby at least one of a metal atom and a semimetal atom are bonded via an oxygen atom; with a polymer compound represented by the following formula (I):

(I)

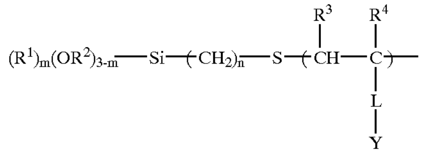

wherein $R^1$, $R^2$, $R^3$ and $R^4$ each independently represent a hydrogen atom or a hydrocarbon group having 1 to 8 carbon atoms; m is 0, 1 or 2; n is an integer of from 1 to 8; L represents a single bond or an organic linking group; and Y represents $—NHCOR^5$, $—CONH_2$, $—CON(R^5)_2$, $—COR^5$, —OH, $—CO_2M$ or $—SO_3M$ wherein $R^5$ represents an alkyl group having 1 to 8 carbon atoms, and M represents a hydrogen atom, an alkali metal, alkaline earth metal or an onium.

2. A lithographic printing plate precursor comprising an image receiving layer and a waterproof substrate, wherein the image receiving layer comprises:

porous filler particles; and a binder resin comprising a complex of: a resin comprising a bond whereby at least one of a metal atom and a semimetal atom are bonded via an oxygen atom; with a polymer compound represented by the following formula (I):

(I)

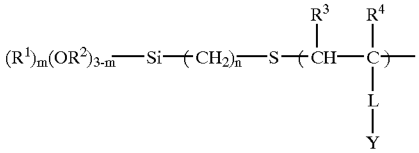

wherein $R^1$, $R^2$, $R^3$ and $R^4$ each independently represent a hydrogen atom or a hydrocarbon group having 1 to 8 carbon atoms; m is 0, 1 or 2; n is an integer of from 1 to 8; L represents a single bond or an organic linking group; and Y represents $—NHCOR^5$, $—CONH_2$, $—CON(R^5)_2$, $—COR^5$, —OH, $—CO_2M$ or $—SO_3M$ wherein $R^5$ represents an alkyl group having 1 to 8 carbon atoms, and M represents a hydrogen atom, an alkali metal, an alkaline earth metal or an onium.

3. The lithographic printing plate precursor according to item 1, wherein the porous filler particles have an average diameter of 3 μm or less and an average length of 100 μm or less.

4. The lithographic printing plate precursor according to item 1 or 3, wherein a content of the needle filler particles is 25% by weight or more to that of all fillers contained in the image receiving layer.

5. The lithographic printing plate precursor according to any one of items 1, 3 and 4, wherein a mixing ratio by weight of the binder resin to all fillers in the image receiving layer is from 80:20 to 5:95.

6. The lithographic printing plate precursor according to any one of items 1 and 3 to 5, wherein the resin comprising the bond is a polymer obtained by hydrolytic cocondensation of at least one compound represented by the following formula (II):

$$(R^{10})_x M^{10}(G)_{z-x} \qquad \text{(II)}$$

wherein $R_{10}$ represents a hydrogen atom, a hydrocarbon group or a heterocyclic group; G represents a reactive group; $M^{10}$ represents a 3- to 6-valent metal or semimetal; z represents a valency of metal or semimetal represented by $M^{10}$; and x is 0, 1, 2, 3 or 4, provided that z-x is 2 or more.

7. The lithographic printing plate precursor according to item 2, wherein an average pore diameter of the porous filler is from 1 Å to 1 μm.

8. The lithographic printing plate precursor according to item 2 or 7, wherein an average specific surface area of the porous filler is from 0.05 $m^2/g$ to 5000 $m^2/g$.

9. The lithographic printing plate precursor according to any one of items 2, 7 an 8, wherein a mixing ratio by weight of the binder resin to all fillers in the image receiving layer is from 80:20 to 5:95.

10. The lithographic printing plate precursor according to any one of items 2 and 7–9, wherein the resin comprising the bond is a polymer obtained by hydrolytic cocondensation of at least one compound represented by the following formula (II):

$$(R^{10})_x M^{10}(G)_{z-x} \qquad \text{(II)}$$

wherein $R^{10}$ represents a hydrogen atom, a hydrocarbon group or a heterocyclic group; G represents a reactive group; $M^{10}$ represents a 3- to 6-valent metal or semimetal; z represents a valency of metal or semimetal represented by $M^{10}$; and x is 0, 1, 2, 3 or 4, provided that z-x is 2 or more.

A large characteristic of the present invention resides in using, as a binder resin, a complex (which will be hereinafter referred to as an "organic/inorganic complex" or merely a "complex") of a resin having a bond whereby a metal atom and/or a semimetal (which will be sometimes referred to as a "(semi)metal" hereinafter) atom are bonded via an oxygen atom with a polymer compound represented by the above-described formula (I). Thus, the moisture retention of the image receiving layer can be considerably elevated without worsening the printing tolerance.

BRIEF DESCRIPTION OF THE DRAWING

FIG. 1 provides a schematic constitution which shows an example of a system to be used in forming an image on the lithographic printing plate precursor according to the present invention.

FIG. 2 provides a schematic constitution which shows the major parts of an inkjet recorder to be used in forming an image on the lithographic printing plate precursor according to the present invention.

FIG. 3 is a partial sectional view which shows the head of an inkjet recorder to be used in forming an image on the lithographic printing plate precursor according to the present invention.

DESCRIPTION OF THE REFERENCE NUMERALS

1: inkjet recorder

2: lithographic printing plate precursor (master)

3: computer

4: bus

10: head

10*a*: jet slit

10*b*: jet electrode

10*c*: counter electrode

101: upper unit

102: lower unit

DETAILED DESCRIPTION OF THE INVENTION

Figure 1:
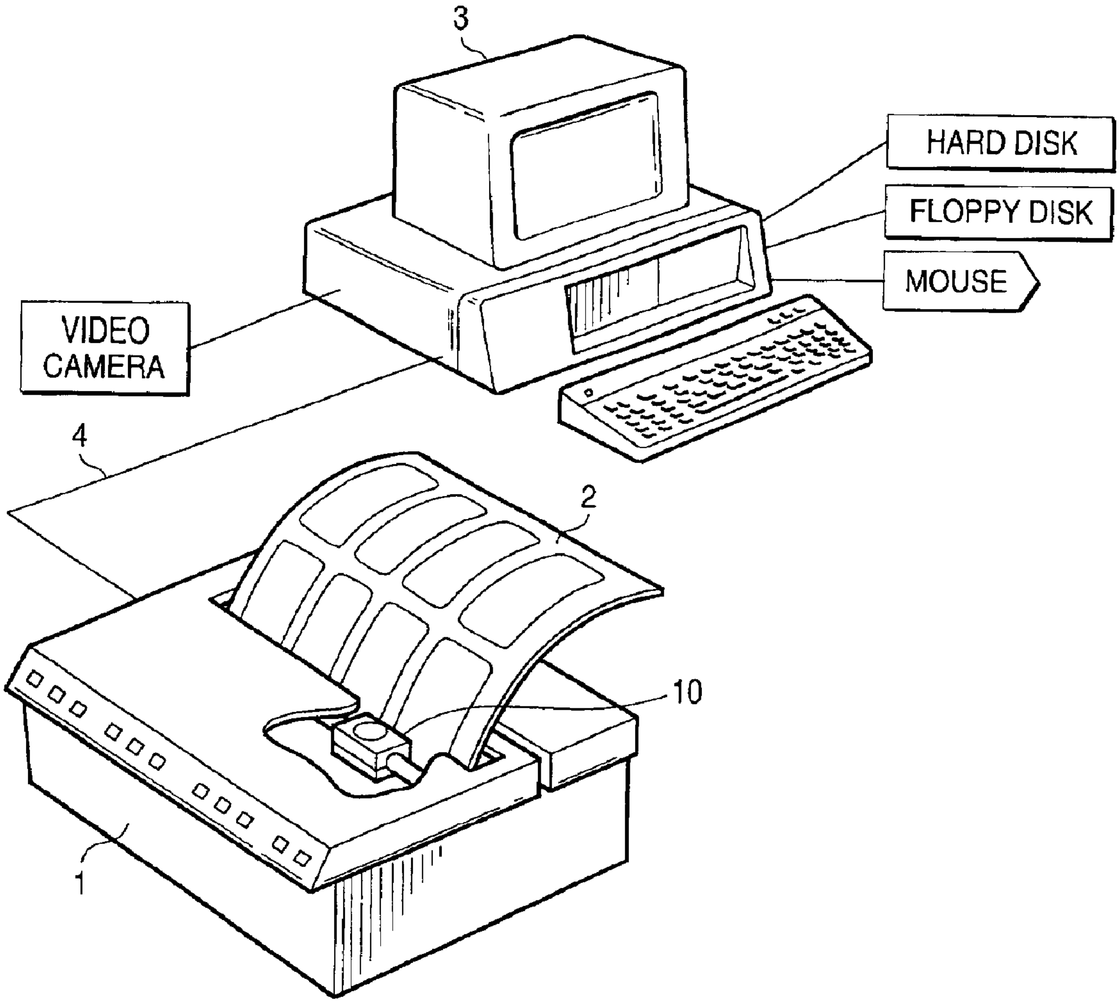
FIG. 1

The present invention will be described in greater detail.

First, the needle filler particles employed in the image receiving layer according to the present invention will be illustrated.

The needle filler to be used in the present invention may be either inorganic particles or organic particles without particular restriction, so long as it is in the form of needles.

Examples of the inorganic needle filler include metals, oxides, complex oxides, hydroxides, carbonates, sulfates, silicates, phosphates, nitrides, carbides, sulfides and complexes of at least two members selected from them. Specific examples thereof include silica, glass, titanium oxide, zinc oxide, alumina, zirconium oxide, tin oxide, potassium titanate, aluminum borate, magnesium oxide, magnesium borate, aluminum hydroxide, magnesium hydroxide, calcium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc carbide and complexes of at least two members selected from them. Preferable examples thereof include silica, glass, titanium oxide, alumina, conductive titanium oxide (tin oxide dope), potassium titanate, aluminum borate, magnesium oxide, calcium carbonate, magnesium carbonate, calcium silicate, magnesium silicate, calcium phosphate and calcium sulfate.

Examples of the organic needle filler include carbon compounds, polymeric whiskers, celluloses and complexes of at least one of them with inorganic compounds. Specific examples thereof include graphite, carbon nanotube, polyoxymethylene whiskers, aromatic polyester whiskers, aramide whiskers, cellulose acetate, ethylcellulose and microbial celluloses. Preferable examples thereof include graphite, poly(p-oxybenzoyl) whisker, poly(2-oxy-6-naphthoyl) whisker and microbial celluloses.

It is preferable that the needle filler has an average diameter of 3 μm or less and an average length of 100 μm or less, still preferably an average diameter of from 0.01 to 3 μm and an average length of from 1 to 100 μm, still preferably an average diameter of 0.02 μm and an average length of from 1 to 50 μm. The aspect ratio (average length/average diameter) of the needle filler appropriately ranges from about 5 to about 10,000, preferably from about 10 to about 5,000 and still preferably from about 20 to about 2,500. By controlling the aspect ratio within the above range, the above-described effects of the present invention can be effectively exerted.

In the present invention, it is not always necessary that all of the fillers to be used in the image receiving layer are needle fillers. That is, it is preferable that the content of the needle filler amounts to 25% by weight or more, still preferably 50% by weight or more and still preferably 75% by weight or more, to the total fillers contained in the image receiving layer.

The fillers to be used together with the above-described needle filler may be any of inorganic fillers, organic fillers, inorganic/organic complex fillers and mixtures of two or more of them. It is preferable to use a filler containing an inorganic material.

Examples of the inorganic fillers include metals, oxides, complex oxides, hydroxides, carbonates, sulfates, silicates, phosphates, nitrides, carbides, sulfides and complexes of at least two members selected from them. Specific examples thereof include glass, titanium oxide, zinc oxide, alumina, zirconium oxide, tin oxide, potassium titanate, aluminum borate, magnesium oxide, magnesium borate, aluminum hydroxide, magnesium hydroxide, calcium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide and complexes of at least two members selected from them. Preferable examples thereof include glass, titanium oxide, alumina, conductive titanium oxide (tin oxide dope), potassium titanate, aluminum borate, magnesium oxide, calcium carbonate, magnesium carbonate, calcium silicate, magnesium silicate, calcium phosphate and calcium sulfate.

Examples of the organic fillers include synthetic resin particles and natural polymer particles. Preferable examples thereof include acrylic resin, polyethylene, polypropylene, polyethylene oxide, polypropylene oxide, polyethylene imine, polystyrene, polyurethane, polyurea, polyester, polyamide, polyimide, carboxymethylcellulose, gelatin, starch, chitin and chitosan. Still preferable examples include resin particles made of acrylic resin, polyethylene, polypropylene, polystyrene, etc.

Examples of the inorganic/organic complex fillers include complexes of the above-described organic fillers with the inorganic fillers. Examples of the inorganic fillers include metal powders, oxides, nitrides, sulfides, carbides and complexes thereof. It is preferable to use oxides, sulfides, etc. therefor. Still preferable examples thereof include particles made of glass, $SiO_2$, $TiO_2$, ZnO, $Fe_2O_3$, $ZrO_2$, $SnO_2$, ZnS, CuS, etc.

It is preferable that the filler to be used together with the above-described needle filler has an average particle diameter of from 0.01 to 50 μm, still preferably an average particle diameter of from 0.03 to 20 μm and still preferably an average particle diameter of from 0.05 to 10 μm. By controlling the average particle diameter within the above range, the effects of the present invention can be effectively exerted.

The mixing ratio by weight of the complex (the binder resin) to the total filler components (i.e., binder resin/total fillers) preferably ranges from 80/20 to 5/95, still preferably from 70/30 to 5/95 and still preferably from 60/40 to 5/95.

Next, the porous filler particles to be used in the image receiving layer according to the present invention will be illustrated.

The porous filler particles according to the present invention may be either inorganic particles or organic particles without particular restriction, so long as being porous.

Examples of the inorganic porous filler include metals, oxides, complex oxides, hydroxides, carbonates, sulfates, silicates, phosphates, nitrides, carbides, sulfides and complexes of at least two members selected from them. Specific examples thereof include silica, glass, titanium oxide, zinc oxide, alumina, zirconium oxide, tin oxide, potassium titanate, aluminum borate, magnesium oxide, magnesium borate, aluminum hydroxide, magnesium hydroxide, calcium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide, zeolite and complexes of at least two members selected from them. Preferable examples thereof include silica, glass, titanium oxide, alumina, zeolite, magnesium oxide, aluminum hydroxide, magnesium hydroxide, calcium hydroxide, calcium carbonate, magnesium carbonate, calcium silicate, magnesium silicate, calcium phosphate and calcium sulfate.

Examples of the organic porous filler include carbon compounds, polymeric compounds, celluloses and complexes of at least one of them with inorganic compounds. Specific examples thereof include charcoal, active carbon, baked porous polymers, resin foams, porous silicone materials and highly water-absorptive resins. Preferable examples thereof include charcoal, active carbon, baked porous polymers and highly water-absorptive resins.

Concerning the size of the porous filler, the average particle diameter preferably ranges from 0.03 μm to 20 μm, still preferably from 0.05 μm to 15 μm and still preferably from 0.1 μm to 10 μm.

Concerning the pore diameter of the porous filler, the average pore diameter distribution preferably ranges from 1 Å to 1 μm, still preferably from 10 Å to 500 nm and still preferably from 50 Å to 300 nm.

Concerning the surface area of the porous filler, the average specific surface area preferably ranges from 0.05 $m^2/g$ to 5000 $m^2/g$, still preferably from 1 $m^2/g$ to 3000 $m^2/g$ and still preferably from 10 $m^2/g$ to 1000 $m^2/g$.

In the present invention, it is not always necessary that all of the fillers to be used in the image receiving layer are porous fillers. That is, it is preferable that the content of the porous filler amounts to 25% by weight or more, still preferably 50% by weight or more and still preferably 75% by weight or more, to the total fillers contained in the image receiving layer.

The fillers to be used together with the above-described porous filler may be any of inorganic fillers, organic fillers, inorganic/organic complex fillers and mixtures of two or more of them. It is preferable to use a filler containing an inorganic material.

Examples of the inorganic fillers include metals, oxides, complex oxides, hydroxides, carbonates, sulfates, silicates, phosphates, nitrides, carbides, sulfides and complexes of at least two members selected from them. Specific examples thereof include glass, titanium oxide, zinc oxide, alumina, zirconium oxide, tin oxide, potassium titanate, aluminum borate, magnesium oxide, magnesium borate, aluminum hydroxide, magnesium hydroxide, calcium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide and complexes of at least two members selected from them. Preferable examples thereof include glass, titanium oxide, alumina, conductive titanium oxide (tin oxide dope), potassium titanate, aluminum borate, magnesium oxide, calcium carbonate, magnesium carbonate, calcium silicate, magnesium silicate, calcium phosphate and calcium sulfate.

Examples of the organic fillers include synthetic resin particles and natural polymer particles. Preferable examples thereof include acrylic resin, polyethylene, polypropylene, polyethylene oxide, polypropylene oxide, polyethylene imine, polystyrene, polyurethane, polyurea, polyester, polyamide, polyimide, carboxymethylcellulose, gelatin, starch, chitin and chitosan. Still preferable examples include resin particles made of acrylic resin, polyethylene, polypropylene, polystyrene, etc.

Examples of the inorganic/organic complex fillers include complexes of the above-described organic fillers with the inorganic fillers. Examples of the inorganic fillers include metal powders, oxides, nitrides, sulfides, carbides and complexes thereof. It is preferable to use oxides, sulfides, etc. therefor. Still preferable examples thereof include particles made of glass, $SiO_2$, $TiO_2$, ZnO, $Fe_2O_3$, $ZrO_2$, $SnO_2$, ZnS, CuS, etc.

It is preferable that the filler to be used together with the above-described porous filler has an average particle diameter of from 0.01 to 50 μm, still preferably an average particle diameter of from 0.03 to 20 μm and still preferably an average particle diameter of from 0.05 to 10 μm. By controlling the average particle diameter within the above range, the effects of the present invention can be effectively exerted.

The mixing ratio by weight of the complex (the binder resin) to the total filler components (i.e., binder resin/total fillers) preferably ranges from 80/20 to 5/95, still preferably from 70/30 to 5/95 and still preferably from 60/40 to 5/95.

Next, the binder resin to be employed in the image receiving layer according to the present invention will be illustrated.

The binder resin of the present invention is characterized by being a resin made up of a complex of a resin (which will be sometimes referred to as a "(semi)metal-containing resin") having a bond whereby a metal atom and/or a semimetal atom are bonded via an oxygen atom with a polymer compound represented by the above-described formula (I).

The polymer compound represented by the formula (I) has a group capable of forming at least a hydrogen bond and/or a chemical bond with the above-described (semi) metal-containing resin and thus forms a complex. The term "chemical bond" as used herein means a chemical bond which is formed by the dehydration condensation of the alkoxysilyl moiety and the reaction with the silica sol gel moiety.

The term "complex of a (semi)metal-containing resin with a polymer compound" as used herein involves a sol material and a gel material.

The (semi)metal-containing resin means a polymer mainly having a bond which is a bond between an oxygen atom and a metal atom or between a semimetal atom and an oxygen bond. The (semi)metal-containing resin may contain both of metal and semimetal atoms. It is preferable to use a resin containing a semimetal atom alone or a resin containing a semimetal atom and a metal atom.

It is preferable that the (semi)metal-containing resin is a polymer obtained by hydrolytic cocondensation of a compound represented by the following formula (II).

$$(R^{10})_x M^{10}(G)_{z-x} \quad \text{(II)}$$

In the formula (II), $R^{10}$ represents a hydrogen atom, a hydrocarbon group or a heterocyclic group; G represents a reactive group; $M^{10}$ represents a 3- to 6-valent metal or semimetal; z represents the valency of $M^{10}$; and x is 0, 1, 2, 3 or 4, provided that z-x is 2 or more.

The term "hydrolytic cocondensation" as used herein means a reaction wherein the reactive group is polymerized via repeated hydrolysis and condensation under acidic or basic conditions. Either one compound as described above or a combination of two or more thereof may be used in producing the (semi)metal-containing resin.

Now, the (semi)metal compound represented by the formula (II) will be illustrated in greater detail.

$R^{10}$ in the formula (II) preferably represents an optionally substituted linear or branched alkyl group having 1 to 12 carbon atoms {for example, methyl, ethyl, propyl, butyl, pentyl, hexyl, heptyl, octyl, nonyl, decyl or dodecyl group; substituent(s) which may be attached to these groups are exemplified by halogen atoms (chlorine, fluorine or bromine atom), hydroxy group, thiol group, carboxy group, sulfo group, cyano group, epoxy group, an —OR' group (wherein R' represents a hydrocarbon group having 1 to 12 carbon atoms (for example, methyl, ethyl, propyl, butyl, hexyl, heptyl, octyl, decyl, propenyl, butenyl, hexenyl, octenyl, 2-hydroxyethyl, 3-chloropropyl, 2-cyanoethyl, N,N-dimethylaminoethyl, 2-bromoethyl, 2-(2-methoxyethyl) ocyethyl, 2-methoxycarbonylethyl, 3-carboxypropyl or benzyl group), —$OCOR^{101}$ group, —$COOR^{101}$ group, —$COR^{101}$ group, —$N(R^{102})$ $(R^{102})$ group (wherein $R^{101}$ has the same meaning as R' as defined above; and $R^{102}$ represents a hydrogen atom or has the same meaning as $R^{101}$ as defined above, provided that $R^{101}$ and $R^{102}$ may be either the same or different), —$NHCONHR^{101}$ group, —$NHCOOR^{101}$ group, —$Si(R^{101})_3$ group, —$CONHR^{102}$ group and —$NHCOR^{101}$ group, provided that the alkyl group may have a plural number of these substituents)}, an optionally substituted linear or branched alkenyl group having 2 to 12 carbon atoms (for example, vinyl, propenyl, butenyl, pentenyl, hexenyl, octenyl, decenyl or dodecenyl group; substituent(s) attached to these groups are exemplified by the same ones as cited above as the substituents of the alkyl groups and two or more substituents may be attached), an optionally substituted aralkyl group having 7 to 14 carbon atoms (for example, benzyl, phenethyl, 3-phenylpropyl, naphthylmethyl or 2-naphthylethyl group; substituent(s) attached to these groups are exemplified by the same ones as cited above as the substituents of the alkyl groups and two or more substituents maybe attached), an optionally substituted alicyclic group having 5 to 10 carbon atoms (for example, cyclopentyl, cyclohexyl, 2-cyclhexylethyl, 2-cyclopentylethyl, norbonyl or adamantyl group; substituent(s) attached to these groups are exemplified by the same ones as cited above as the substituents of the alkyl groups and two or more substituents may be attached), an optionally substituted aryl group having 6 to 12 carbon atoms (for example, phenyl or naphthyl group; substituent(s) attached to these groups are exemplified by the same ones as cited above as the substituents of the alkyl groups and two or more substituents may be attached), or an optionally fused heterocyclic group having at least one atom selected from among nitrogen, oxygen and sulfur atoms (for example, heterocycles such as pyran, furan, thiophene, morfolin, pyrrole, thiazole, oxazole, pyridine, piperidine, pyrrolidone, benzothiazole, benzoxazole, quinoline or tetrahydrofuran cycle; substituent(s) attached to these groups are exemplified by the same ones as cited above as the substituents of the alkyl groups and two or more substituents may be attached).

The reactive group G represents preferably a hydroxy group, a halogen atom (for example, fluorine, chlorine, bromine or iodine atom), —$OR^{11}$ group, —$OCOR^{12}$ group, —$CH(COR^{13})(COR^{14})$ group, —$CH(COR^{13})(COOR^{14})$ group or —$N(R^{15})(R^{16})$ group.

In the —$OR^{11}$ group, $R^{11}$ represents an optionally substituted aliphatic group having 1 to 10 carbon atoms (for example, methyl, ethyl, propyl, butyl, pentyl, hexyl, heptyl, octyl, nonyl, decyl, propenyl, butenyl, heptenyl, hexenyl, octenyl, decenyl, 2-hydroxyethyl, 2-hydroxypropyl, 2-methoxyethyl, 2-(methoxyethyloxy)ethyl, 2-(N,N-diethylamino)ethyl, 2-methoxypropyl, 2-cyanoethyl, 3-methyloxypropyl, 2-chloroethyl, cyclohexyl, cyclopentyl, cyclooctyl, chlorocyclohexyl, methoxycyclohexyl, benzyl, phenethyl, dimethoxybenzyl, methylbenzyl or bromobenzyl group).

In the —$OCOR^{12}$ group, $R^{12}$ represents an aliphatic group the same as $R^{11}$ or an optionally substituted aromatic group having 6 to 12 carbon atoms (which is exemplified by those cited above concerning the aryl group of $R^{10}$).

In the —$CH(COR^{13})(COR^{14})$ and —$CH(COR^{13})(COOR^{14})$ groups, $R^{13}$ represents an alkyl group having 1 to 4 carbon atoms (for example, methyl, ethyl, propyl or butyl group) or an aryl group (for example, phenyl, tolyl or xylyl group), while $R^{14}$ represents an alkyl group having 1 to 6 carbon atoms (for example, methyl, ethyl, propyl, butyl, pentyl or hexyl group), an aralkyl group having 7 to 12 carbon atoms (for example, benzyl, phenethyl, phenylpropyl, methylbenzyl, methoxybenzyl, carboxybenzyl or chlorobenzyl group) or an aryl group (for example, phenyl, tolyl, xylyl, mesityl, methoxyphenyl, chlorophenyl, carboxyphenyl or diethoxyphenyl group).

In the —$N(R^{15})$ $(R^{16})$ group, $R^{15}$ and $R^{16}$ may be the same or different from each other and each represents a hydrogen atom or an optionally substituted aliphatic group having 1 to 10 carbon atoms (for example, those cited above as the examples of $R^{11}$ in the —$OR^{11}$ group). It is still preferable that the sum of the carbon atoms in $R^{15}$ and $R^{16}$ is not more than 12.

Preferable examples of the (semi)metal $M^{10}$ include transition metals, rare earth metals and metals of the groups III to V in the periodic table. Still preferable examples thereof include Al, Si, S, Ge, Ti and Zr and Al, Si, Sn, Ti, Zr, etc. are still preferable. Si is particularly preferable therefor.

Specific examples of the (semi)metal compound represented by the formula (III) include the following compounds, though the present invention is not restricted thereto.

Methyltrichlorosilane, methyltribromosilane, methyltrimethoxysilane, methyltriethoxysilane, methyltriisopropoxysilane, methyltri-t-butoxysilane, ethyltrichlorosilane, ethyltribromosilane, ethyltrimethoxysilane, ethyltriethoxysilane, ethyltriisopropoxysilane, ethyltri-t-butoxysilane, n-propyltrichlorosilane, n-propyltribromosilane, n-propyltrimethoxysilane, n-propyltriethoxysilane, n-propyltriisopropoxysilane, n-propyl-tri-t-butoxysilane, n-hexyltrichlorosilane, n-hexyltribromosilane, n-hexyltrimethoxysilane, n-hexyltriethoxysilane, n-hexyltriisopropoxysilane, n-hexyl-tri-t-butoxysilane, n-decyltrichlorosilane, n-decyltribromosilane, n-decyltrimethoxysilane, n-decyltriethoxysilane, n-decyltriisopropoxysilane, n-decyl-tri-t-butoxysilane, n-octadecyltrichlorosilane, n-octadecyltribromosilane, n-octadecyltrimethoxysilane, n-octadecyltriethoxysilane, n-octadecyltriisopropoxysilane, n-octadecyl-tri-t-butoxysilane, phenyltrichlorosilane, phenyltribromosilane, phenyltrimethoxysilane, phenyltriethoxysilane, phenyltriisopropoxysilane, phenyl-tri-t-butoxysilane, tetrachlorosilane, tetrabromosilane, tetramethoxysilane, tetraethoxysilane, tetraisopropoxysilane, tetrabutoxysilane, dimethoxyethoxysilane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, triethoxyhydrosilane, tribromohydrosilane, trimethoxyhydrosilane, isopropoxyhydrosilane, tri-t-butoxyhydrosilane, vinyltrichlorosilane, vinyltribromosilane, vinyltrimethoxysilane, vinyltriethoxysilane, vinyltriisopropoxysilane, vinyltri-t-butoxysilane, trifluoropropyltrichlorosilane, trifluoropropyltribromosilane, trifluoropropyltrimethoxysilane, trifluoropropyltriethoxysilane, trifluoropropyltriisopropoxysilane, trifluoropropyltri-t-butoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriisopropoxysilane, γ-methacryloxypropyltri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyltrit-butoxysilane, γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyltrit-butoxysilane, β-(3,4-epoxycyclohexyl) ethyltrimethoxysilane, β-(3,4-epoxycyclohexyl) ethyltriethoxysilane, $Ti(OR^{17})_4$ (wherein $R^{17}$ represents an alkyl group (for example, methyl, ethyl, propyl, butyl, pentyl or hexyl group)), $TiCl_4$, $Zn(OR^{17})_2$, $Zn(CH_3COCHCOCH_3)_2$, $Sn(OR^{17})_4$, $Sn(CH_3COCHCOCH_3)_4$, $Sn(OCOR^{17})_4$, $SnCl_4$, $Zr(OR^{17})_4$, $Zr(CH_3COCHCOCH_3)_4$ and $Al(OR^{17})_3$.

Next, the polymer compound which forms a complex with the above-described (semi)metal-containing resin in the present invention will be illustrated.

The polymer compound represented by the formula (I) according to the present invention is a hydrophilic polymer having a silane coupling agent at an end. It will be optionally called a "specific hydrophilic polymer" hereinafter.

In the above formula (I), R, $R^1$, $R^2$, $R^3$ and $R^4$ independently represent each a hydrogen atom or a hydrocarbon group having 1 to 8 carbon atoms. Examples of the hydrocarbon group include alkyl groups and aryl groups. Among all, a linear or branched alkyl group having 8 or less carbon atoms is preferable. Specific examples thereof include methyl group, ethyl group, propyl group, butyl group, pentyl group, hexyl group, heptyl group, octyl group, isopropyl group, isobutyl group, s-butyl group, t-butyl group, isopentyl group, neopentyl group, 1-methylbutyl group, isohexyl group, 2-ethylhexyl group, 2-methylhexyl group and cyclopentyl group. From the viewpoints of effects and availability, it is preferable that $R^1$, $R^2$, $R^3$ and $R^4$ are each a hydrogen atom or a methyl group or an ethyl group.

These hydrocarbon groups may further have substituents.

In case of an alkyl group has substituent(s), the substituted alkyl group is formed by the bond of the substituents to an alkylene group. As the substituents, use is made of monovalent nonmetal atom groups other than hydrogen.

Preferable examples thereof include halogen atoms (—F, —Br, —Cl, —I), hydroxyl group, alkoxy groups, aryloxy groups, mercapto group, alkylthio groups, arylthio groups, alkyldithio groups, aryldithio groups, amino group, N-alkylamino groups, N,N-diarylamino groups, N-alkyl-N-arylamino groups, acyloxy groups, carbamoyloxy group, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, acylthio groups, acylamino groups, N-alkylacrylamino groups, N-arylacylamino groups, ureido group, N'-alkylureido groups, N',N'-dialkylureido groups, N'-arylureido groups, N',N'-diarylureido groups, N'-alkyl-N'-arylureido groups, N-alkylureido groups, N-arylureido groups, N'-alkyl-N-alkylureido groups, N'-alkyl-N-arylureido groups, N',N'-dialkyl-N-alkylureido groups, N',N'-dialkyl-N-arylureido groups, N'-aryl-N-alkylureido groups, N'-aryl-N-arylureido groups, N',N'-diaryl-N-alkylureido groups, N',N'-diaryl-N-arylureido groups, N'-alkyl-N'-aryl-N-alkylureido groups, N'-alkyl-N'-aryl-N-arylureido groups, alkoxycarbonylamino groups, aryloxycarbonylamino groups, N-alkyl-N-alkoxycarbonylamino groups, N-alkyl-N-aryloxycarbonylamino groups, N-aryl-N-alkoxycarbonylamino groups, N-aryl-N-aryloxycarbonylamino groups, formyl group, acyl groups, carboxyl group, alkoxycarbonyl groups, aryloxycarbonyl groups, carbamoyl group, N-alkylcarbamoyl groups, N,N-dialkylcarbamoyl groups, N-arylcarbamoyl groups, N,N-diarylcarbamoyl groups, N-alkyl-N-arylcarbamoyl groups, alkylsulfinyl groups, arylsulfinyl groups, alkylsulfonyl groups, arylsulfonyl groups, sulfo ($—SO_3H$) group and its conjugated base group thereof (hereinafter referred to as "sulfonate group"), alkoxysulfonyl groups, aryloxysulfonyl groups, sulfinamoyl group, N-alkylsulfinamoyl groups, N,N-dialkylsulfinamoyl groups, N-arylsulfinamoyl groups, N,N-diarylsulfinamoyl groups, N-alkyl-N-arylsulfinamoyl groups, sulfamoyl group, N-alkylsulfamoyl groups, N,N-dialkylsulfamoyl groups, N-arylsulfamoyl groups, N,N-diarylsulfamoyl groups, N-alkyl-N-arylsulfamoyl groups, phosphono ($—PO_3H_2$) group and its consugated base group (hereinafter referred to as "phosphonate group"), dialkylphosphono ($—PO_3(alkyl)_2$) groups, diarylphosphono ($—PO_3(aryl)_2$) groups, alkylarylphosphono ($—PO_3$ (alkyl) (aryl)) groups, monoalkylphosphono ($—PO_3H(alkyl)$) groups and their conjugated base groups (hereinafter referred to as "alkylphosphonate groups"), monoarylphosphono groups ($—PO_3H(aryl)$) groups and their conjugated base groups (hereinafter referred to as "arylphosphonate groups"), phosphonoxy ($—OPO_3H_2$) group and its conjugated base group (hereinafter referred to as "phosphonatoxy group"), dialkylphosphonoxy ($—OPO_3$ $(alkyl)_2$) groups, diarylphosphonoxy ($—OPO_3(aryl)_2$) groups, alkylarylphosphonoxy ($—OPO_3(alkyl)(aryl)$) groups, monoalkylphosphonoxy ($—OPO_3H(alkyl)$) groups and their conjugated base groups (hereinafter referred to as "alkylphosphonatoxy groups"), monoarylphosphonoxy ($—OPO_3H(aryl)$) groups and their conjugated base groups (hereinafter referred to as "arylphosphonatoxy groups"), morpholino group, cyano group, nitro group, aryl groups, alkenyl groups and alkynyl groups.

Specific examples of the alkyl groups in these substituents include the above-described alkyl groups, Specific examples of the aryl groups include phenyl group, biphenyl group, naphthyl group, tolyl 2 group, xylyl group, mesityl group, cumenyl group, chlorophenyl group, bromophenyl group, chloromethylphenyl group, hydroxyphenyl group, methoxyphenyl group, ethoxyphenyl group, phenoxyphenyl group, acetoxyphenyl group, benzoyloxyphenyl group, methylthiophenyl group, phenylthiophenyl group, methylaminophenyl group, dimethylaminophenyl group, acetylaminophenyl group, carboxyphenyl group, methoxycarbonylphenyl group, ethoxyphenylcarbonyl group, phenoxycarbonylphenyl group, N-phenylcarbamoyl group, phenyl group, cyanophenyl group, sulfophenyl group, sulfonatophenyl group, phosphonophenyl group and phosphonatophenyl group. Examples of the alkenyl groups include vinyl group, 1-propenyl group, 1-butenyl group, cinnamyl group and 2-chloro-2-ethenyl group. Examples of the alkynyl groups include ethynyl group, 1-propynyl group, 1-butynyl group and trimethylsilylethynyl group. As $K^1$ in the acyl ($K^1CO—$) groups, hydrogen and the above-described alkyl groups and aryl groups may be cited.

Among these substituents, still preferable examples include halogen atoms (—F, —Br, —Cl, —I), alkoxy groups, aryloxy groups, alkylthio groups, arylthio groups, N-alkylamino groups, N,N-dialkylamino groups, acyloxy groups, N-alkylcarbamoyloxy groups, N-arylcarbamoyloxy groups, acylamino groups, formyl group, acyl groups, carboxyl group, alkoxycarbonyl groups, aryloxycarbonyl groups, carbamoyl group, N-alkylcarbamoyl groups, N,N-dialkylcarbamoyl groups, N-arylcarbamoyl groups, N-alkyl-N-arylcarbamoyl groups, sulfo group, sulfonate group, sulfamoyl group, N-alkylsulfamoyl groups, N,N-dialkylsulfamoyl groups, N-arylsulfamoyl groups, N-alkyl-N-arylsulfamoyl groups, phosphono group, phosphanate group, dialkylphosphono groups, diarylphosphono groups, monoalkylphosphono groups, alkylphosphonate groups, monoarylphosphono groups, phosphonoxy group, phosphonatoxy group, aryl groups and alkenyl groups.

On the other hand, examples of the alkylene groups in the substituted alkyl groups include divalent organic residues obtained by subtracting any one of the hydrogen atoms on the above-described alkyl groups having 1 to 20 carbon atoms. Preferable examples thereof include linear alkylene groups having 1 to 12 carbon atoms, branched alkylene groups having 3 to 12 carbon atoms and cyclic alkylene groups having 5 to 10 carbon atoms. Specifically preferable examples of the substituted alkyl groups formed by combining the substituents with the alkylene groups include chloromethyl group, bromomethyl group, 2-chloroethyl group, trifluoromethyl group, methoxymethyl group, methoxyethoxyethyl group, aryloxymethyl groups, phenoxymethyl group, methylthiomethyl group, tolylthiomethyl group, ethylaminoethyl group, diethylaminopropyl group, morpholinopropyl group, acetyloxymethyl group, benzoyloxymethyl group, N-cyclohexylcarbamoyloxyethyl group, N-phenylcarbamoyloxyethyl group, acetylaminoethyl group, N-methylbenzoylaminopropyl group, 2-oxyethyl group, 2-oxypropyl group, carboxypropyl group, methoxycarbonylethyl group, allyloxycarbonylbutyl group, chlorophenoxycarbonylmethyl group, carbamoylmethyl group, N-methylcarbamoylethyl group, N,N-dipropylcarbamoylmethyl group, N-(methoxyphenyl) carbamoylethyl group, N-methyl-N-(sulfophenyl) carbamoylmethyl group, sulfobutyl group, sulfonatobutyl group, sulfamoylbutyl group, N-ethylsulfamoylmethyl group, N,N-dipropylsulfamoylpropyl group, N-tolylsulfamoylpropyl group, N-methyl-N-(phosphanophenyl)sulfamoyloctyl group, phosphonobutyl group, phosphonatohexyl group, diethylphosphonobutyl group, diphenylphosphonopropyl group, methylphosphonobutyl group, methylphosphonatobutyl group, triphosphonohexyl group, triphosphonatohexyl groupm phosphonoxypropyl group, phosphonatoxybutyl group, benzyl group, phenethyl group, α-methylbenzyl group, 1-methyl-1-phenylethyl group, p-methylbenzyl group, cinnamyl group, allyl group, 1-propenylmethyl group, 2-butenyl group, 2-methylallyl group, 2-methylpropenylmethyl group, 2-propynyl group, 2-butynyl group and 3-butynyl group.

L represents a single bond or an organic linking group. In case where L represents an organic linking group, L is a polyvalent linking group made up of nonmetal atoms. More specifically, it is made up of from 1 to 60 carbon atoms, from 0 to 10 nitrogen atoms, from 0 to 50 oxygen atoms, from 1 to 100 hydrogen atoms and from 0 to20 sulfur atoms. More specific examples of the linking group include the following structural units and combinations thereof.

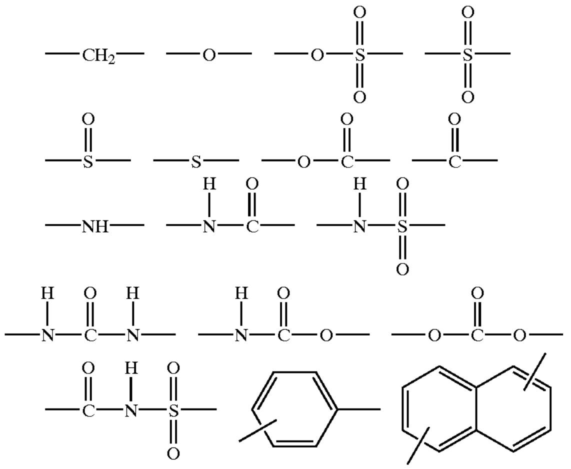

-continued

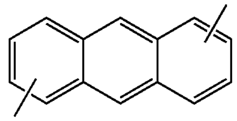

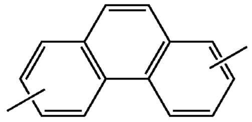

Y represents —$NHCOR^5$, $CONH_2$, —$CON(R^5)_2$, —$COR^5$, —OH, —$CO_2M$ or —$SO_3M$ wherein $R^5$ represents a branched or linear alkyl group having 1 to 8 carbon atoms. In case of having a plural number of $R^5$s such as —$CON(R^5)_2$, $R^5$s may be either the same or different from each other. Moreover, $R^5$s may be bonded to each other to form a ring which may be a heterocycle having a heteroatom such as an oxygen atom, a sulfur atom or a nitrogen atom. Further, $R^5$ may have substituent(s). As the substituents which can be introduced therein, use may be made of the same substituents as cited above as the substituents which can be introduced into $R^1$, $R^2$, $R^3$ and $R^4$.

Specific examples of $R^5$ include methyl group, ethyl group, propyl group, butyl group, pentyl group, hexyl group, heptyl group, octyl group, isopropyl group, isobutyl group, s-butyl group, t-butyl group, isopentyl group, neopentyl group, 1-methylbutyl group, isohexyl group, 2-ethylhexyl group, 2-methylhexyl group and cyclopentyl group.

Examples of M include a hydrogen atom; alkali metals such as lithium, sodium and potassium; alkaline earth metals such as calcium and barium; and oniums such as ammonium, iodonium and sulfonium.

Favorable specific examples of Y include —$NHCOCH_3$, —$CONH_2$, —COOH, $SO_3^-NMe_4$ and morpholino groups.

The weight-average molecular weight (Mw) of the polymer compound represented by the formula (I) preferably ranges from 200 to 100000, still preferably from 300 to 50000 and still preferably from 500 to 20000.

Examples (cited compounds I-1 to I-12) of the specific hydrophilic polymer appropriately usable in the present invention are as follows, though the present invention is not restricted thereto.

I-1

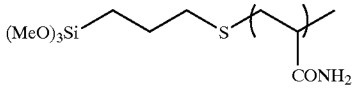

(Mw)
5000

I-2

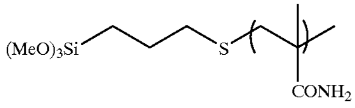

10000

I-3

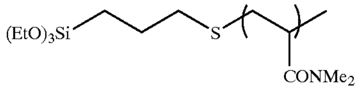

5000

I-4

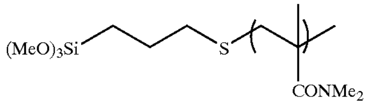

8000

I-5

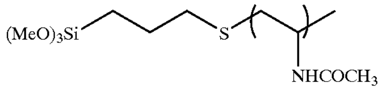

5000

-continued

I-6

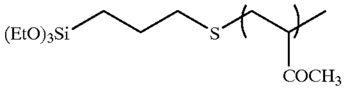

7000

I-7

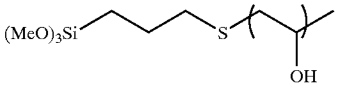

4000

I-8

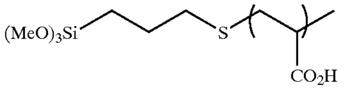

6000

I-9

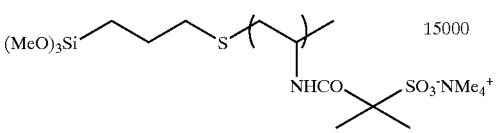

15000

I-10

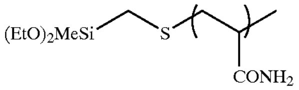

5000

I-11

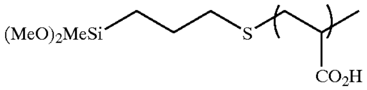

6000

I-12

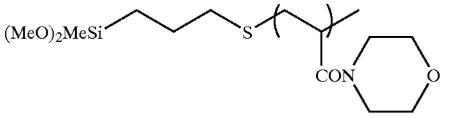

12000

The specific hydrophilic polymer according to the present invention can be synthesized by radical polymerization of a radical-polymerizable monomer represented by the following formula (i) using a silane coupling agent represented by the following formula (ii) having chain transferability in radical polymerization. Since the silane coupling agent (ii) has the chain transferability, a polymer having a silane coupling group introduced into an end of the polymer main chain can be synthesized by the radical polymerization.

(i)

(ii)

$$(R^1)_m(OR^2)_{3-m}\text{—Si—}(CH_2)_n\text{—S—H}$$

In the above formulae (i) and (ii), $R^1$ to $R^4$, L, Y, n and m are each as defined above concerning the formula (I). These compounds are commercially available. Alternatively, they can be easily synthesized.

As the radical polymerization method for synthesizing the hydrophilic polymer represented by the formula (I), use can be made of any publicly known method. More specifically, common radical polymerization methods are described in Shin Kobunshi Jikkengaku 3, Kobunshi no Gosei to Hanno 1 (edited by Kobunshi Gakkai, Kyoritsu Shuppan), Shin Jikken Kagaku Koza 19, Kobunshi Kagaku (I) (edited by Nippon Kagakukai, Maruzen), Busshitsu Kogaku Koza, Kobunshi Gosei Kagaku (Tokyo Denki Daigaku Shuppan-kyoku) and so on. These methods are usable herein.

In the complex, either one of the polymer compounds (I) according to the present invention or a mixture of two or more of the same may be used. It is also possible to use at least one of the above-described polymer compounds (I) with another polymer compound. In case of using another polymer compound, the other compound may be used without any problem, so long as it is used in an amount not exceeding the amount of the above-described polymer compound (I). It is preferable that the content of the other polymer compound amounts to 50% by weight or less, still preferably 25% by weight or less based on the total polymer compounds.

The polymer compound which can be used together may be either a natural water soluble polymer, a semi-synthetic water soluble polymer or a synthetic polymer. More specifically, it is possible to use those described in Daiyuukikagaku 19, Tennen Kobunshi Kagobutsu I, revised by Mujio Kotake, Asakura Shoten (1960); Suiyosei Kobunshi Suibunsangata Jushi Sogo Gijutsu Shiryo-shu, edited by Keiei Kaihatsu Senta Suppan-bu, Keiei Kaihatsu Senta Suppan-bu (1981); Shin-suiyosei Porima no Oyo to Shijo, Shinji Nagao, CMC (1988); Kinosei Serurose no Kaihatsu, CMC (1985); and so on.

Examples of the natural and semi-synthetic polymers include cellulose, cellulose derivatives (for example, cellulose esters such as cellulose nitrate, cellulose sulfate, cellulose acetate, cellulose propionate, cellulose succinate, cellulose butyrate, cellulose acetate succinate, cellulose acetate butyrate and cellulose acetate phthalate; cellulose ethers such as methylcellulose, ethylcellulose, cyanoethylcellulose, carboxymethylcellulose, hydroxyethylcellulose, hydroxypropylcellulose, ethylhydroxyethylcellulose, hydroxypropylmethylcellulose and carboxymethylhydroxyethyl cellulose), starch, starch derivatives (for example, oxidized starch, esterified starch such as nitric acid, sulfuric acid, phosphoric acid, acetic acid, propionic acid, butyric acid and succinic acid esters, etherified starches such as methyl, ethyl, cyanoethyl, hydroxyalkyl and carboxymethyl ethers), arginic acid, pectin, carrageenan, tamarind gum, natural gums (for example, acacia, guar gum, locustbean gum, tragacanth gum, xanthan gum), pullulan, dextran, casein, gelatin, chitin and chitosan.

Examples of the synthetic polymers include polyvinyl alcohol, polyalkylene glycols (for example, polyethylene glycol, polypropylene glycol, (ethylene glycol/propylene glycol) copolymer), aryl alcohol copolymers, acrylate or methacrylate polymers and copolymers having at least one hydroxyl group (ester substituent: 2-hydroxyethyl group, 3-hydroxypropyl group, 2,3-dihydroxypropyl group, 3-hydroxy-2-hydroxymethyl-2-methylpropyl group, 3-hydroxy-2,2-di(hydroxymethyl)propyl group, polyoxyethylene group, polyoxypropylene group, etc.) and N-substituted polymers and copolymers of acrylamides or methacrylamides having at least one hydroxyl group (N-substituent: monomethylol group, 2-hydroxyethyl group, 3-hydrxypropyl group, 1,1-bis(hydroxymethyl)ethyl group, 2,3,4,5,6-pentahydroxypentyl group, etc.). However, any synthetic polymer may be used therefor without specific restriction, so long as it has at least one hydroxyl group in a side chain substituent in its repeating unit.

Either one of these other polymer compounds or two or more thereof may be used. The mass-average molecular weight of such a polymer compound preferably ranges from $10^3$ to $10^6$, still preferably from $5\times10^3$ to $4\times10^5$.

In the complex of the (semi)metal-containing resin with the polymer compound (i.e., the polymer compound of the formula (I) optionally together with another polymer compound; the same will apply hereinafter), the ratio of the (semi)metal-containing resin to the polymer compound may be selected from a wide range. It is preferable that the mass ratio of (semi)metal-containing resin/polymer compound ranges from 10/90 to 90/10, still preferably from 20/80 to 80/20. In case where the ratio falls within this range, it is possible to establish a high film strength of the image receiving layer and a favorable waterproofness against dampening water in the step of printing.

In the binder resin containing the complex according to the present invention, a uniform organic or inorganic hybrid is formed due to the hydrogen bond, etc. between the hydroxyl group of the (semi)metal-containing resin formed by the hydrolytic cocondensation of the above-described (semi)metal compound and the above-described specific linking group in the polymer compound. Thus, the binder resin becomes micro-homogeneous without suffering from phase separation. In case where the (semi)metal-containing resin has a hydrocarbon group, it is assumed that the affinity for the polymer compound is further improved owing to the hydrocarbon group. Moreover, the complex according to the present invention has excellent film-forming properties.

The complex according to the present invention can be produced by subjecting the above-described (semi)metal compound to the hydrolytic cocondensation and then mixing with the polymer compound, or subjecting the above-described (semi)metal compound to the hydrolytic cocondensation in the presence of the polymer compound.

It is preferable to obtain the organic/inorganic complex according to the present invention by the hydrolytic cocondensation of the above-described (semi)metal compound by the sol-gel method in the presence of the polymer compound. In the organic/inorganic complex thus formed, the polymer compound is uniformly dispersed in the gel matrix (i.e., a three-dimensional micronetwork structure of an inorganic (semi)metal oxide) formed by the hydrolytic cocondensation of the (semi)metal compound.

The sol-gel method cited above as a preferable method can be carried out using a publicly known sol-gel method. More specifically, it can be performed according to a method described in detail in Zoru-Geru-ho ni yoru Hakumaku Koteingu Gijutsu, Gijutu Joho-kai K. K. (1955); Zoru-Geru-ho no Kagaku, Sumio Sakuhana, Agune Shofusha K.K. (1988); Saishin Zoru-Geru-ho ni yoru Kinosei Hakumaku Sakusei Gijutsu, Sogo Gijutsu Senta (1992); etc.

It is favorable to use an aqueous solvent in the coating solution for the image receiving layer. To obtain a homogeneous solution by preventing sedimentation in the step of preparing the coating solution, a water soluble solvent is further employed. Examples of the water soluble solvent include alcohols (methanol, ethanol, propyl alcohol, ethylene glycol, diethylene glycol, propylene glycol, dipropylene glycol, ethylene glycol monomethyl ether, propylene glycol monomethyl ether, ethylene glycol monoethyl ether, etc.), ethers (tetrahydrofuran, ethylene glycol dimethyl ether, propylene glycol dimethyl ether, tetrahydropyran, etc.), ketones (acetone, methyl ethylketone, acetyl acetone, etc.), esters (methyl acetate, ethylene glycol monoacetate, etc.) and amides (formamide, N-methylformamide, pyrrolidone, N-methylpyrrolidone, etc.). Either one of these solvents or a mixture of two or more thereof may be used.

To accelerate the hydrolysis and cocondensation reaction of the (semi)metal compound represented by the above formula (II), it is preferable to further use an acidic catalyst or a basic catalyst.

As the catalyst, use is made of an acidic or basic compound as such or a solution dissolved in a solvent such as water or an alcohol (which will be respectively referred to as an acidic catalyst or a basic catalyst hereinafter). Although the concentration is not particularly restricted, a higher concentration would result in a higher hydrolysis and polycondensation speed. In case of using a basic catalyst at a high concentration, however, a precipitate is sometimes formed in the sol solution. It is therefore favorable that the basic catalyst has a concentration of 1 N (expressed in the concentration in an aqueous solution) or lower.

The acidic catalyst or the basic catalyst is not particularly restricted in type. In case where it is needed to employ a catalyst at a high concentration, it is favorable to select a catalyst which is made up of elements scarcely remaining in the catalyst crystals after baking. Specific examples of the acidic catalyst include hydrogen halide such as hydrochloric acid, nitric acid, sulfuric acid, sulfurous acid, hydrogen sulfide, perchloric acid, hydrogen peroxide, carboxylic acids such as carbonic acid, formic acid and acetic acid, substituted carboxylic acids wherein R in the structural formula RCOOH has been substituted by another element or a substituent and sulfonic acids such as benzenesulfonic acid. Examples of the basic catalyst include ammonia bases such as aqueous ammonia and amines such as ethylamine and aniline.

In addition, the image receiving layer may contain a crosslinking agent to further improve the film strength. As the crosslinking agents, compounds commonly employed as a crosslinking agent may be cited. More specifically, use can be made of compounds described in Kakyozai Handobukku, edited by Shinzo Yamashita and Tosuke Kaneko, Taiseisha (1981); Kobunshi Deta Handobukku, Kiso-hen, edited by Kobunshi Gakkai, Baifukan (1986); etc.

Examples thereof include ammonium chloride, metal ions, organic peroxides, polyisocyanate compounds (for example, toluylene diisocyanate, diphenylmethane diisocyanate, triphenylmethane triisocyanate, polymethylenephenyl isocyanate, hexamethylene diisocyanate, isophorone diisocyanate and high-molecular weight polyisocyanate), polyol compounds (for example, 1,4-butanediol, polyoxypropylene glycol, polyoxyethylene glycol and 1,1,1-trimethylolpropane), polyamine compounds (for example, ethylenediamine, γ-hydroxypropylated ethylenediamine, phenylenediamine, hexamethylenediamine, N-aminoethylpiperazine and modified aliphatic polyamines), polyepoxy group-containing compounds and epoxy resins (for example, compounds described in Shin Epokishi Jushi, Hiroshi Kakiuchi, Shokodo (1985); Epokishi Jushi, Kuniyuki Hashimoto, Nikkan Kogyo Shinbunsha (1969); etc.), melamine resins (for example, compounds described in Yuria Meramin Jushi, Ichiro Miwa and Hideo Matsui, Nikkan Kogyo Shinbunsha (1969); etc.) and poly(meth)acrylate compounds (for example, compounds described in Origoma, edited by Makoto Ogawara, Takeo Saegusa and Toshinobu Tomura, Kodansha (1976); Kinosei Akurirukei Jushi, Hidezo Omori, Tekunosisutemu (1985); etc.).

The image receiving layer according to the present invention can be formed by applying an image receiving layer coating solution onto the waterproof substrate with the use of one of publicly known coating methods and then drying.

The film thickness of the image receiving layer thus formed preferably ranges from 0.2 to 10 μm, still preferably form 0.5 to 8 μm. In case where the film thickness falls within this range, a film of a uniform thickness can be formed and a sufficient film thickness can be established.

It is preferable that the image receiving layer according to the present invention has a surface smoothness represented by Bekk smoothness of 30 (sec/10 ml) or above. The Bekk smoothness can be measured with a Bekk smoothness test machine by pressing a sample piece at a constant pressure (1 $kg/cm^2$) onto a circular glass plate having highly smoothened surface and being provided with a hole formed at the center and measuring the time required for the passage of a constant amount (10 ml) of air through the space between the glass face and the test piece under reduced pressure.

In case of making a plate (image formation) with an electrophotographic printer, the preferable Bekk smoothness range may be determined depending on the toner type, namely, either a dry toner or a liquid toner.

In an electrophotographic printer with the use of a dry toner, the Bekk smoothness of the image receiving layer surface of the printing plate precursor according to the present invention preferably ranges from 30 to 200 (sec/10 ml), still preferably from 50 to 150 (sec/10 ml). In case where the Bekk smoothness falls within this range, deposition of flying toner on the non-image parts (i.e., background stain) can be prevented and the toner can uniformly and sufficiently deposit on the image parts in the process of transferring and fixing the toner image on the printing plate precursor. Thus, a favorable reproducibility of thin lines and fine characters can be established and a highly homogeneous solid image can be obtained.

In an electrophotographic printer with the use of a liquid toner, on the other hand, the Bekk smoothness of the image receiving layer surface is 30 (sec/10 ml) or higher. A higher Bekk smoothness is the more favorable. Namely, it preferably ranges from 150 to 3000 (sec/10 ml), still preferably from 200 to 2500 (sec/10 ml).

In an inkjet printer or a thermal transfer printer, it is preferable that the Bekk smoothness falls within the range as defined in the above case of an electrophotographic printer with the use of a liquid toner. When the Bekk smoothness falls within this range, toner image parts having thin lines, fine characters, half tone images, etc. can be properly transferred and formed on the image receiving layer and the image receiving layer surface can sufficiently deposit on the toner image parts. Thus, the image part strength can be maintained at a favorable level.

It is still-preferable that the image receiving layer according to the present invention has high convexities formed at small intervals on the surface (i.e., highly uneven surface). More specifically, it is preferable that the image receiving layer has a surface center roughness (SRa) defined according to ISO-468 of 1.3 to 3.5 μm and an average wavelength (Sλa) showing the surface roughness density of 50 μm or less. It is still preferable that SRa ranges from 1.25 to 2.5 μm and Sλa is 45 μm or less. Owing to this structure, it is estimated that the deposition of flying toner on the non-image parts after the photographic plate making and thickening of the depositing toner at the fixation can be controlled.

Next, the waterproof substrate to be used in the present invention will be illustrated.

Examples of the waterproof substrate include an aluminum plate, a zinc plate, bimetallic plates such as a copper-aluminum plate and a copper-stainless plate, trimetallic plates such as a chromium-copper aluminum plate, a chromium-lead-iron plate and a chromium-copper-stainless plate having a thickness of from 0.1 to 3 mm, in particular, from 0.1 to 1 mm. Also, use may be made of paper having been subjected to a waterproofing treatment, paper having a plastic film or a metallic foil laminated thereon and plastic films of 80 μm to 200 μm in thickness.

It is preferable that the substrate to be used in the present invention has a highly smooth surface. That is to say, it is preferable that the smoothness (expressed in Bekk smoothness) of the surface to be in contact with the image receiving layer is adjusted to 300 (sec/10 ml) or above, still preferably from 900 to 3000 (sec/10 ml) and still preferably from 1000 to 3000 (sec/10 ml).

By controlling the smoothness of the surface of the substrate to be in contact with the image receiving layer to 300 (sec/10 ml; expressed in Bekk smoothness), the image reproducibility and printing tolerance can be further improved. These improving effects can be achieved even in case where the image receiving layer surface has the same smoothness. It is therefore considered that an increase in the smoothness of the substrate surface contributes to the improvement in the adhesiveness between the image parts and the image receiving layer.

The highly smooth surface of the waterproof substrate thus controlled means the face to which the image receiving layer is to be directly applied. In case of forming a conductive layer, an under layer or an overcoat layer on the substrate as will be described hereinafter, the above surface means the surface of the conductive layer, the under layer or the overcoat layer.

Thus, the image receiving layer having been controlled in the surface state as described above can be sufficiently held without affected by the uneven surface of the substrate and, in its turn, the image qualities can be further improved.

To control the smoothness within the range as specified above, use can be made of various publicly known methods. More specifically, the Bekk smoothness of the substrate surface can be controlled by, for example, melt-depositing the substrate surface using a resin or calender-strengthening with a highly smooth heat roller.

Moreover, the direct draw type lithographic printing plate precursor according to the present invention can be preferably employed as a lithographic printing plate precursor wherein a toner image is formed on the image receiving layer provided on the waterproof substrate by the electrophotographic recording system, or an image is formed by the inkjet system of the static jet type of jetting an oil-base ink with the use of an electrostatic field. The lithographic plate having the thus formed image can provide a large number of copies having a clear image.

In forming an image by the electrophotographic system, it is a common practice to statically transfer a toner image onto a transfer material by the electrophotographic process. It is preferable that the waterproof substrate serving as the printing plate precursor has a conductivity. It is particularly preferable that the volume-intrinsic resistivity of the waterproof substrate ranges from $10^4$ to $10^{13}$ Ω·cm, still preferably from $10^7$ to $10^{12}$ Ω·cm. Thus, bleeding or distortion in the image, deposition of the toner on the non-image parts, etc. can be inhibited to a practically negligible level and a favorable image can be obtained.

In forming an image by the inkjet system of the static jet type, it is preferable that the above-described waterproof substrate has a conductivity. It is preferable that the part of the waterproof substrate immediately below the image receiving layer has an intrinsic resistivity of $10^{10}$ Ω·cm or less. It is still preferable that the whole waterproof substrate has an intrinsic resistivity of $10^{10}$ Ω·cm or less. It is still preferable that the above-described resistivity is $10^8$ Ω·cm or less and the lower limit may approach zero as far as possible. In case where the conductivity falls within the range as defined above, charged ink droplets immediately disappear through the contact face as soon as they deposit on the image receiving layer. As a result, a clear image free from any disorder can be formed.

The intrinsic resistivity (which is also called volume-intrinsic resistivity or specific resistivity) is measured by using the three-terminal method provided with a guard electrode in accordance with JIS K-6911.

Conductivity may be imparted to the part of the substrate immediately below the image receiving layer as described above by applying a layer containing a conductive filler such as carbon black with a binder on the substrate such as paper or a film, bonding a metallic foil thereto, or vapor-depositing a metal.

On the other hand, examples of the substrate having a conductivity as a whole include conductive papers impregnated with, for example, sodium chloride, plastic films containing conductive fillers such as carbon black and metal plates such as aluminum plates.

Namely, such a substrate can be obtained by, for example, using a conductive master paper made up of a base material impregnated with sodium chloride, etc. and forming waterproof conductive layers on both faces thereof. As the master paper serving as the base material, use may be made of woodpulp paper, synthetic pulp paper or a woodpulp/synthetic pulp mixed paper maybe used as such. The thickness of the master paper preferably ranges from 80 μm to 200 μm.

The conductive layers can be formed by applying a layer containing a conductive filler and a binder on both faces of the above-described conductive paper. The conductive layers thus formed preferably have a thickness of from 5 μm to 20 μm.

Examples of the conductive filler include granular carbon black, graphite, metal (for example, silver, copper, nickel, brass, aluminum, steel, stainless) powders, a tin oxide powder, aluminum or nickel flakes and fibrous carbon.

The resin serving as the binder may be appropriately selected from among various resins. Specific examples thereof include waterproof resins such as acrylic resins, vinyl chloride-based resins, styrene-based resins, styrene-butadiene-based resins, styrene-acrylic resins, urethane-based resins, vinylidene chloride-based resins and vinyl acetate-based resins; and hydrophilic resins such as polyvinyl alcohol-based resins, cellulose-based resins, starch and its derivatives, polyacrylamide-based resins and styrene-maleic anhydride-based copolymers.

As another method of forming the conductive layer, it is possible to laminate a conductive film. As the conductive film, use may be made of, for example, a metallic foil or a conductive film. More specifically speaking, the metallic foil lamination material is exemplified by an aluminum foil while the conductive plastic film lamination material is exemplified by a polyethylene resin containing carbon black. As the aluminum foil, either a hard foil or a flexible one may be used and the thickness thereof preferably ranges from 5 μm to 20 μm.

To laminate the polyethylene resin containing carbon black, it is preferable to employ the extrusion lamination method. In the extrusion lamination method, the polyethylene is molten into a film by heating, then immediately applied to a master paper and cooled for lamination. Various apparatuses have been known therefor. The thickness of the laminate layer preferably ranges from 10 μm to 30 μm. In case of using a conductive plastic film or a metal plate as the base material to give a substrate having a conductivity as a whole, the substrate can be used as such so long as it has a sufficient waterproofness.

As the conductive plastic film, use can be made of polypropylene and polyester films containing a conductive filler such as carbon fiber or carbon black. As the metal plate, use can be made of aluminum, etc. The thickness of the base material preferably ranges from 80 μm to 200 μm. In case where the thickness of the base material is less than 80 μm, only an insufficient strength as a printing plate can be obtained. In case where the thickness exceeds 200 μm, handling properties such as transferability in a drawing unit are worsened.

Next, a constitution provided with a conductive layer will be illustrated.

As the waterproof base material, use can be made of a paper having been subjected to a waterproofing treatment, a paper having a plastic film or a metallic foil laminated thereon or a plastic film (thickness: 80 to 200 μm).

To form the conductive layer on the base material, it is possible to employ the methods described in the above case where the substrate has a conductivity as a whole. That is to say, a layer containing a conductive filler and a binder is applied on one face of the substrate to give a thickness of 5 μm to 20 μm. Alternatively, a metallic foil or a conductive plastic film may be laminated.

As an alternative method, it is also possible to form a vapor deposition film made of aluminum, tin, palladium, gold, etc. on a plastic film.

Thus a conductive waterproof substrate can be obtained.

In the present invention, a backcoat layer (a back face layer) may be formed on the face of the substrate opposite to the image receiving layer as described above to thereby to prevent curling. It is preferable that the backcoat layer has a smoothness of from 150 to 700 (sec/10 ml). Thus, the printing plate can be properly set to a printer without causing positioning error or slippage in the step of supplying the printing plate to an offset printer.

The film thickness of the waterproof substrate provided with the under layer or the backcoat layer ranges from 90 to 130 μm, preferably from 100 to 120 μm.

The lithographic printing plate precursor according to the present invention can be used preferably as a lithographic printing plate precursor of the direct draw type. Using the same, a printing plate can be made by forming an image by the thermal transfer recording system, the electrophotographic system or the inkjet recording system.

As the electrophotographic system, any of publicly known recording systems may be used. Examples thereof include methods described in Denshi Shashin Gijutsu no Kiso to Oyo, edited by Denshi Shashin Gakkai, Korona-sha (1988); Kenichi Eda, Denshi Shashin Gakkai-shi 27, 113, (1988), Akio Kawamoto, ibid. 33, 149 (1994); Akio Kawamoto, ibid. 32, 196 (1993); etc. or use of a marketed PPC copying machine.

Combined use of the scanning exposure system, wherein exposure with laser beams is carried out based on digital data, with the development system using a developing solution is an effective process, since a highly precise image can be formed thereby. Next, an example thereof will be illustrated.

First, a sensitive material is positioned on a flat bed by the resister pin method and then fixed by sucking from the rear. Next, the sensitive material is charged with the use of, for example, a charging device described in the above-cited document Denshi Shashin Gijutsu no Kiso to Oyo, in page 212 and thereafter. In general, the corotron or scotron system is employed therefor. In this step, it is desirable to apply feedback based on data of the sensitive material obtained from charge potential detection means so as to maintain the surface potential within a definite range, thereby controlling the charging conditions. Subsequently, scanning exposure is carried out in accordance with, for example, a method described in page 254 and thereafter in the document cited above.

Then a toner image is formed by using a developing solution. The sensitive material having been charged and exposed on the flat bed can be taken off and subjected to wet development according to a method described in page 275 and thereafter in the document cited above. In this step, an exposure mode corresponding to the toner image development mode is selected. In case of reversal development, for example, a negative image (i.e., the image part) is irradiated with laser beams. Using a toner having the same charge polarity as the charge polarity at the charging of the sensitive material, a development bias voltage is applied so as to electrically deposit the toner in the exposed part. Detailed principle is described in page 157 and thereafter in the document cited above.

After the completion of the development, the excessive developing solution is removed by squeezing with the use of a squeeze (for example, rubber roller, gap roller, reverse roller) described in page 283 in the document cited above or a corona squeezer, an air squeezer, etc. Before the squeezing, it is also favorable to rinse the material exclusively with the vehicle employed in the developing solution.

Next, the toner image which has been formed on the sensitive material as described above is transferred and fixed on the lithographic printing plate precursor, i.e., the transfer material. Alternatively, the toner image can be transferred and fixed on the lithographic printing plate precursor via an intermediate transfer material.

Although any of the publicly known recording systems may be used as the inkjet recording system, it is favorable to use an oil-base ink from the viewpoints of the drying and fixation of an ink image, plugging, etc. and to elect the static-jetting inkjet system whereby an image scarcely suffers from bleeding. It is also favorable to use the solid jet system with the use of a hot-melt ink.

As the inkjet system of the on-demand type with the use of electrostatic power, there has been known a system called an electrostatic acceleration inkjet system or a slit jet system as reported by Susumu Ichinose and Yuji Oba, Denshi Tsushingakkai-shi Vol. J66-C(No.1), p. 47 (1983); Tadayoshi Ono and Mamoru Minakuchi, Gazo Denshigakkai-shi, Vol. 10, (No. 3), p. 157 (1981); etc. Specific embodiments of these systems are disclosed by, for example, Japanese Patent Laid-Open No. 170/1981, Japanese Patent Laid-Open No.4467/1981 and Japanese Patent Laid-Open No. 151374/1982.

In this system, an ink is supplied into a slit ink chamber provided with a large number of electrodes within a slit ink holder and a high voltage is applied selectively to these electrodes. Thus, the ink around the electrodes is jetted toward a recording paper facing closely to the slit, thereby recording.

As another system without resort to a slit recording head, Japanese Patent Laid-Open No. 211048/1986 discloses a method. In this method, a film type ink holder having a plural number of small pores is used and an ink is filled into these pores. Then a voltage is selectively applied with the use of a multi-stylus electrode so as to transfer the ink in the pores onto a recording paper. As examples of the solid jet system, marketed print systems such as Solid Inkjet Platemaker SJ02A (manufactured by Hitachi-Koki) and MP-1200 Pro (manufactured by Dynic) may be cited.

Now, a plate making method with the use of the inkjet recording system will be described more specifically by reference to the attached figures. FIG. 1 shows an apparatus having an inkjet recorder 1 with the use of an oil-base ink.

As FIG. 1 shows, the pattern data of an image (diagrams or letters) to be formed on the master (lithographic printing plate precursor) 2 is supplied into an inkjet recorder 1 from a data source such as a computer 3 via transfer means such as a bus 4. An inkjet recording head 10 in the recorder 1 has the oil-base ink pooled therein. When the master 2 passes through the recorder 1, small ink droplets are sprayed onto the master 2 on the basis of the above-described data. Thus, the ink is deposited on the master 2 in accordance with the above-described pattern. Thus, the image is formed on the master 2 to give a plate making master (i.e., a master plate for printing).

Figure 2:
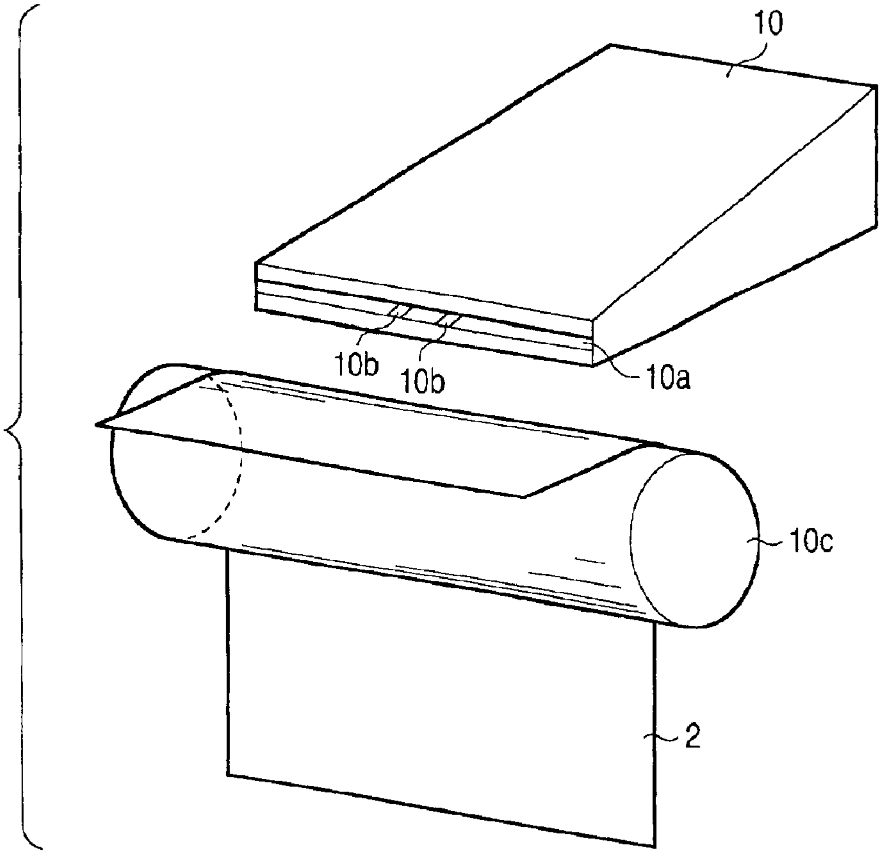
FIG. 2
Figure 3:
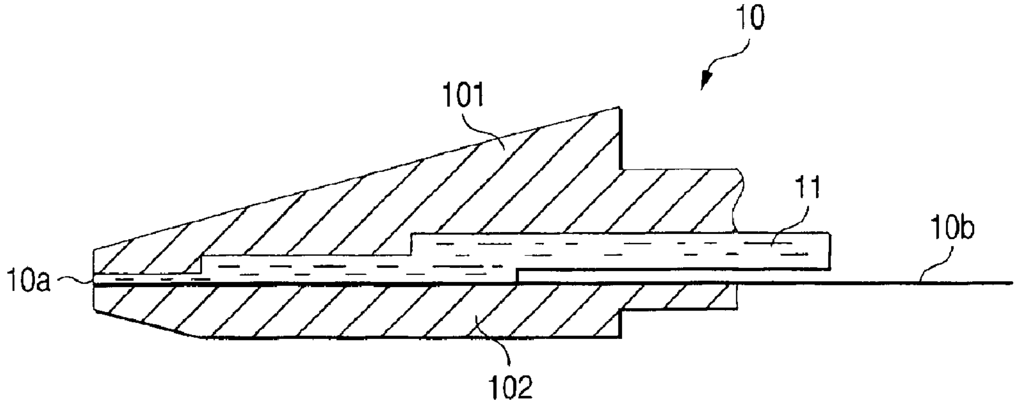
FIG. 3

FIGS. 2 and 3 show examples of the inkjet recorder employed in the apparatus of FIG. 1. The same numerical symbols are assigned to members employed commonly in FIGS. 2 and 3.

FIG. 2 is a schematic view showing the constitution of the major parts of the inkjet recorder, while FIG. 3 is a partial sectional view of the head.

As FIG. 3 shows, the head 10 attached to the inkjet recorder has a slit which is located between an upper unit 101 and a lower unit 102 and has a jet slit 10*a* at the tip. A jet electrode 10*b* is provided within the slit and the inside of the slit is filled with an oil-base ink 11.

In the head 10, a voltage is applied to the jet electrode 10*b* in accordance with the digital signals of the image pattern data. As FIG. 2 shows, a counter electrode 10*c* is provided facing to the jet electrode 10*b* and the master 2 is placed on the counter electrode 10*c*. As the voltage is applied, a circuit is formed between the jet electrode 10*b* and the counter electrode 10*c*. The oil-base ink 11 is jetted from the jet slit 10*a* of the head 10 and thus an image is formed on the master 2 located on the counter electrode 10*c*.

To form a high-quality image, it is preferable to minimize the tip width of the jet electrode 10*b*.

In case where the head 10 in FIG. 3 is filled with the oil-base ink, the jet electrode 10*b* having a tip width of 20 μm is used, the interval between the jet electrode 10*b* and the counter electrode 10*c* is adjusted to 1.5 mm and a voltage of 3 kV is applied between these electrodes for 0.1 msec, then a dot print of 40 μm can be formed on the master 2.

As described above, an image is formed on the lithographic printing plate precursor by the inkjet system with the use of an oil-base ink, thereby providing a plate making master.

EXAMPLES

The present invention will be described in greater detail by reference to the following examples. However, the present invention is not construed as being restricted thereto.

Example 1

<Production of Lithographic Printing Plate Precursor>

The following composition 1 was dispersed together with glass beads in a paint shaker (manufactured by Toyoseiki) at room temperature for 10 minutes. Then 33 g of the composition 2 was added and the resultant mixture was dispersed in a paint shaker (manufactured by Toyoseiki) at room temperature for additional 1 minute. After filtering off the glass beads, a dispersion was obtained.

| (Composition 1) | |
|---|---|
| Needle filler; conductive titanium oxide FT2000 (manufactured by Ishihara Sangyo, average diameter 0.1 μm, average length 2 μm) | 31 g |
| Hydrophilic polymer (Compound I-1) as 5 wt % aqueous solution | 70 g |
| Colloidal silica as 20% aqueous solution; Snowtex C (manufactured by Nissan Chemical Industries) | 60 g |

-continued

| (Composition 2) | |
|---|---|
| Tetraethoxysilane | 92 g |
| Ethanol | 163 g |
| Water | 163 g |
| Nitric acid | 0.1 g |

To the substrate (Bekk smoothness in the under side: 1000 (sec/10 cc)) of an ELP-1X master (manufactured by Fuji Photo Film) employed as an electrophotogrqaphic lithographic printing plate precursor in the field of rough printing, the above-described image receiving layer composition was applied with a wire bar in such a manner as to give a coating dose after drying of 5 $g/m^2$. Then it was dried in an oven at 100° C. for 10 minutes.

The smoothness of the lithographic printing plate precursor, which was measured by using a Bekk smoothness test machine (manufactured by Kumagai Riko) at an air volume of 10 cc, was 205 (sec/10 cc). Further, the surface contact angle of the lithographic printing plate precursor after 30 seconds, which was measured by putting 2 μl of distilled water on the surface of the lithographic printing plate precursor and using a surface contact angle meter (CA-D™, manufactured by Kyowa Kaimen Kagaku), was 5° or less.

The lithographic printing plate precursor as described above was employed in plate making by using a laser printer AMSI 1200-J Plate Setter™ marketed as AM-Straight Imaging System with the use of a dry toner.

When the copied image on the plate thus obtained was examined with the naked eye via a magnifying lens (×20), the plate showed favorable image qualities. Namely, the plate according to the present invention thus obtained by dry toner transfer from the laser printer was a favorable one without suffering from any problem in practical use, i.e., being free from any drop-off of thin lines or fine letters and homogenous in the solid parts and showing no irregular toner transfer and little background fog in the non-image parts due to flying toner.

Next, the above-described lithographic printing plate precursor was subjected to the same plate making procedure as the one described above and then employed in printing by using a full-automated printer AM-2850™ (manufactured by AM). In the printing, a PS treating agent EU-3 (manufactured by Fuji Photo Film) diluted 50-fold with distilled water was introduced as dampening water into a dampening water receiver and a varnish-containing magenta ink for offset printing was employed. The printed image on the 10th copy was evaluated by examining background fog and solid homogeneity in the image parts with the naked eye through a magnifying lens (×20). As a result, it was found that highly favorable image qualities were thus established.

Moreover, more than 10,000 copies each having an image showing a high homogeneity without any drop-off in thin lines and fine characters in the solid parts and substantially being free from any ink stains in the non-image parts were obtained.

Namely, the printing plate precursor according to the present invention makes it possible to provide a large number of excellent copies.

Comparative Example 1

A lithographic printing plate precursor was produced as in EXAMPLE 1 but using PVA217 (manufactured by Kuraray)

as a substitute for the hydrophilic polymer according to the present invention (Compound I-1).

The obtained printing plate precursor had a surface Bekk smoothness of 160° (sec/10 cc) and a contact angle with water of 50 or less.

This printing plate precursor was subjected to the same plate making procedure as in EXAMPLE 1 and printing was carried out. Although the resultant plate showed favorable image qualities comparable to EXAMPLE 1 with little flying toner in the non-image parts, the copies showed stains in the non-image parts immediately after starting.

Example 2

<Production of Lithographic Printing Plate Precursor>

The following composition 3 was dispersed together with glass beads in a paint shaker (manufactured by Toyoseiki) at room temperature for 10 minutes. Then 33 g of the composition 4 was added and the resultant mixture was dispersed in a paint shaker (manufactured by Toyoseiki) at room temperature for additional 1 minute. After filtering off the glass beads, a dispersion was obtained.

| | |
|---|---|
| (Composition 3) | |
| Needle filler; potassium titanate whisker TISMO N (manufactured by Otsuka Chemical, average diameter 0.4 μm, average length 15 μm) | 20 g |
| Rutile type titanium oxide (manufactured by Wako Pure Chemical Industries, average diameter 0.3 μm) | 11 g |
| Hydrophilic polymer (Compound I-5) as 5 wt % aqueous solution | 70 g |
| Colloidal silica as 20% aqueous solution; Snowtex C (manufactured by Nissan Chemical Industries) | 60 g |
| (Composition 4) | |
| Tetraethoxysilane | 92 g |
| Ethanol | 163 g |
| Water | 163 g |
| Nitric acid | 0.1 g |

To the substrate (Bekk smoothness in the under side: 2000 (sec/10 cc) or more) of an ELP-1X master (manufactured by Fuji Photo Film) employed as an electrophotogrqaphic lithographic printing plate precursor in the field of rough printing, the above-described composition was applied with a wire bar in such a manner as to give a coating dose after drying of 6 g/m$^2$. After drying to touch, it was further dried at 110° C. for 30 minutes to give a lithographic printing plate precursor. The smoothness of the obtained lithographic printing plate precursor was 1000 (sec/10 cc), while its contact angle with water was 50 or less.

<Production of Electrophotographic Sensitive Material>

A mixture of 2 g of X type nonmetallic phthalocyanin (manufactured by Dainippon Ink and Chemicals), 14.4 g of the following binder resin (P-1), 3.6 g of the following binder resin (P-2), 0.15 g of the following compound (A) and 80 g of cyclohexanone was introduced together with glass beads into a 500 ml glass container and dispersed in a paint shaker (manufactured by Toyoseiki Seisakusho) for 60 minutes. Then the glass beads were filtered off to give a sensitive layer dispersion.

Binder resin (P-1):

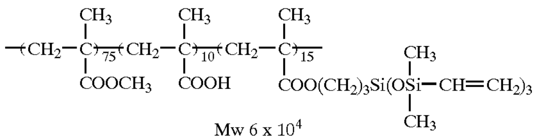

Mw 6 x 10$^4$

Binder resin (P-2):

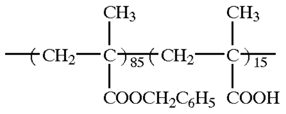

Mw 8 x 10$^3$

Compound (A):

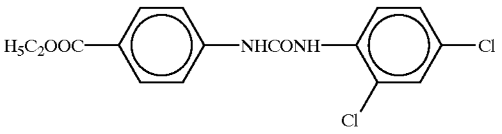

Next, this dispersion was applied with a wire bar onto a degreased aluminum plate of 0.2 mm in thickness. After drying to touch, it was heated in a circulatory oven at 110° C. for 20 seconds. The sensitive layer thus obtained had a film thickness of 8 μm.

The electrophotographic sensitive material thus produced was corona-charged in a dark place to give a surface potential of +450V. Based on the data which had been read from an original copy with a color scanner, subjected to color separation, corrected to reproduce some colors characteristic to the system and then stored as digital image data in a hard disk in the system, the sensitive material was then exposed to light of 788 mm with the use of a semiconductor laser drawer as an exposure apparatus at a beam spot diameter of 15 μm, a pitch of 10 μm and a scan speed of 300 cm/sec (i.e., 2500 dpi). The exposure was carried out in such a manner as to give an exposure dose on the sensitive material of 25 erg/cm$^2$.

Subsequently, it was developed with the developing solution as will be shown hereinafter and stains in the non-image parts were removed by rinsing in a bath of Isoper G alone. Next, it was dried with a hot air stream giving a surface temperature of the sensitive material of 50° C. until the content of Isoper G reached 10 mg/g of the toner. Subsequently, this sensitive material was precharged at −6 KV with a corona charging device. The image face of the sensitive material was piled on the above-described lithographic printing plate precursor and the image was transferred by negative corona discharge from the electrophotographic sensitive material side.

<Developing Solution>

The following components were kneaded in a kneader at 95° C. for 2 hours to give a mixture. After cooling in the kneader, this mixture was ground in the kneader too. One part by weight (mass) of this ground material and 4 parts by weight of Isoper H were dispersed in a paint shaker for 6 hours to give a dispersion. This dispersion was diluted with Isoper G so as to give a toner solid content of 1 g/l. At the same time, basic barium petronate was added as a charge controller for imparting negative charge to give a content of 0.1 g/l. Thus, a developing solution was prepared.

| (Composition for kneading) | |
|---|---|
| Ethylene-methacrylic acid copolymer (Nucrel N-699 manufactured by Du Pont-Mitsui) | 4 parts by weight |
| Carbon black #30 (manufactured by Mitsubishi Chemical Industries) | 1 part by weight |
| Isoper L (manufactured by Exon) | 15 parts by weight |

The lithographic printing plate precursor having the image thus formed was heated to 100° C. for 30 seconds to thereby completely fix the toner image parts.

The image drawn on the plate thus obtained was evaluated by observing under an optical microscope (×200). As a result, it was found out that the image was very clear without having any bleeding or drop-off in thin lines, fine characters, etc.

Using the printing plate thus formed, printing was carried out with a printer (Model Oliver 94 manufactured by Sakurai Seisakusho). In the printing, SLM-OD (manufactured by Mitsubishi Paper Mills) diluted 100-fold with distilled water was introduced as dampening water into a dampening water receiver and a varnish-containing magenta ink for offset printing was employed.

The printed image on the 10th copy was evaluated with the naked eye through a magnifying lens (×20). As a result, no background stain due to the deposition of the printing ink was observed in the non-image parts and the solid image parts showed a high homogeneity. When further examined under an optical microscope (×200), favorable image qualities were observed without any thinning, drop-off, etc. in thin lines and fine characters. More than 10,000 copies having comparable image qualities could be obtained.

Example 3

<Production of Waterproof Substrate>

Using a woodfree paper of 100 $g/m^2$ in weight as a base material, a back layer coating of the following composition was applied to one face of the base material with a wire bar to form a back layer having a dry coating dose of 12 $g/m^2$. Then it was calendered to give a smoothness of the back layer of about 100 (sec/10 ml).

| (Coating for back layer) | |
|---|---|
| Kaolin (50% aqueous dispersion) | 200 parts |
| Aqueous polyvinyl alcohol solution (10%) | 60 parts |
| SBR latex (solid content 50%, Tg: 0° C.) | 100 parts |
| Melamine resin (solid content 80%, Sumirez Resin SR-613) | 5 parts |

Next, an under layer coating of the following composition was applied to the other face of the base material with a wire bar to form an under layer having a dry coating dose of 10 $g/m^2$. Then it was calendered to give a smoothness of the under layer of about 1500 (sec/10 ml).

| (Coating for under layer) | |
|---|---|
| Carbon black (30% aqueous dispersion) | 5.4 parts |
| Clay (50% aqueous dispersion) | 54.6 parts |
| SBR latex (solid content 50%, Tg: 25° C.) | 36 parts |
| Melamine resin (solid content 80%, Sumirez Resin SR-613) | 4 parts |

The above components were mixed together and water was added to give a total solid content of 25%, thereby preparing the under layer coating.

The intrinsic resistivity of the under layer thus obtained was measured in the following manner.

The under layer coating was applied on a sufficiently degreased stainless plate to give a coating film having a dry coating dose of 10 $g/m^2$. When measured by using the three-terminal method provided with a guard electrode in accordance with JIS K-6911, the intrinsic resistivity of the obtained sample was $4\times10^9$ Ω·cm.

The following composition 5 was dispersed together with glass beads in a paint shaker (manufactured by Toyoseiki) at room temperature for 10 minutes. Then 33 g of the composition 6 was added and the resultant mixture was dispersed in a paint shaker (manufactured by Toyoseiki) at room temperature for additional 1 minute. After filtering off the glass beads, a dispersion was obtained.

| (Composition 5) | |
|---|---|
| Needle filler; aluminum borate whisker Alborex Y (manufactured by Shikoku Kasei, average diameter 0.1 μm, average length 20 μm) | 31 g |
| Hydrophilic polymer (Compound I-12) as 5 wt % aqueous solution | 70 g |
| Colloidal silica as 20% aqueous solution; Snowtex C (manufactured by Nissan Chemical Industries) | 60 g |
| (Composition 6) | |
| Tetramethoxysilane | 92 g |
| Ethanol | 163 g |
| Water | 163 g |
| Nitric acid | 0.1 g |

To the above-described waterproof substrate, this dispersion was applied with a wire bar in such a manner as to give a coating dose after drying of 6 $g/m^2$. Then it was dried in an oven at 100° C. for 20 minutes to give a lithographic printing plate precursor.

<Preparation of Oil-base Ink (IK-1)>

(Production of Resin Particles)

A liquid mixture of 14 g of poly(dodecyl methacrylate), 100 g of vinyl acetate, 4.0 g of octadecyl methacrylate and 286 g of Isoper H was heated to 70° C. while stirring under a nitrogen gas stream. As a polymerization initiator, 1.5 g of 2,2'-azobis(isovaleronitrile) (abbreviated as A.I.V.N.) was added thereto and the resultant mixture was reacted for 4 hours. Further, 0.8 g of 2,2'-azobis(isobutyronitrile) (abbreviated as A.I.B.N.) was added and the resultant mixture was heated to 80° C. and then reacted for 2 hours. Subsequently, 0.6 g of A.I.B.N. was added and the reaction was continued for 2 hours. Then the temperature was elevated to 100° C. and the mixture was stirred as such for 1 hour to distill off the unreacted monomers. After cooling and filtering through a 200-mesh nylon cloth, the obtained white dispersion was a latex having a degree of polymerization of 93% and an average particle diameter of 0.35 μm. The particle diameter was measured with CAPA-500 (manufactured by Horiba).

(Production of Ink)

10 g of a dodecyl methacrylate/acrylic acid copolymer (copolymerization ratio: 98/2 by weight), 10 g of Alkali Blue and 30 g of Shell Sol 71 were introduced into a paint shaker (manufactured by Toyoseiki) together with glass beads and dispersed for 4 hours. Thus a blue microdispersion of Alkali Blue was obtained.

50 g (on the solid basis) of the above-described resin particles, 5 g (on the solid basis) of the above-described blue dispersion and 0.06 g of zirconium naphthenate were diluted with 1 l of Isoper G to thereby give a blue oil-base ink (IK-1).

Using the printing plate precursor obtained above, printing was carried out with the use of the above-described oil-base ink (IK-1) by modifying a servo plotter DA8400 (manufactured by Graphtec) by which PC output can be drawn, attaching an inkjet head shown in FIG. 2 to a pen plotter unit and placing the lithographic printing plate precursor on a counter electrode located at an interval of 1.5 mm. In the plate making, the under layer formed immediately below the image receiving layer of the printing plate precursor was electrically connected to the counter electrode with the use of a silver paste.

The plate thus made was heated with a Richo Fuser (manufactured by Richo) controlled to give a plate face temperature of 70° C. for 10 seconds to thereby fix the ink image.

The image on the plate thus obtained was examined by observing under an optical microscope (×200). As a result, it was found out that a clear image free from any bleeding or drop-off in thin lines, fine characters, etc. could be thus obtained.

Using the printing plate thus formed, printing was carried out with a printer (Model Oliver 94 manufactured by Sakurai Seisakusho). In the printing, EU-3 (manufactured by Fuji Photo Film) diluted 100-fold with distilled water was introduced as dampening water into a dampening water receiver and a varnish-containing magenta ink for offset printing was employed.

The printed image on the 10th copy was evaluated with the naked eye through a magnifying lens (×20). As a result, no background stain due to the deposition of the printing ink was observed in the non-image parts and the solid image parts showed a high homogeneity. When further examined under an optical microscope (×200), favorable image qualities were observed without any thinning, drop-off, etc. in thin lines and fine characters. More than 10,000 copies having comparable image qualities could be obtained.

Examples 4 to 9

Lithographic printing plate precursor were produced as in EXAMPLE 3 but using the compounds listed in the following TABLE 1 as substitutes for the hydrophilic polymer (Compound I-12) employed in EXAMPLE 3.

TABLE 1

| Example | Hydrophilic polymer |
|---|---|
| Example 4 | Compound I-2 |
| Example 5 | Compound I-4 |
| Example 6 | Compound I-7 |
| Example 7 | Compound I-9 |
| Example 8 | Compound I-10 |
| Example 9 | Compound I-11 |

The surface Bekk smoothness of each of the printing plate precursors thus obtained fell within a range of from 800 to 1200 (sec/10 cc) while the contact angle with water was 5° or less. When a printing plate was produced and printing was carried out as in EXAMPLE 3, each of the obtained copies showed a clear image without any strain in the non-image parts, as in EXAMPLE 3. Also, a high printing tolerance (more than 10,000 copies) could be achieved.

Example 10

Using the lithographic printing plate precursor produced in EXAMPLE 3, plate making was performed with the use of Solid Inkjet Platemaker SJ120 (manufactured by Hitachi-Koki) which is a marketed inkjet plate maker with the use of solid inks.

When the copied image on the plate thus obtained was examined with the naked eye via a magnifying lens (×20), the plate showed favorable image qualities. Namely, the plate according to the present invention thus obtained by using the solid inkjet printer was a favorable one without suffering from any drop-off of thin lines or fine letters. It was homogenous in the solid parts and showed no background fog in the non-image parts due to flying toner.

Next, the above-described lithographic printing plate precursor was subjected to the same plate making procedure as the one described above and then employed in printing by using a full-automated printer AM-2850™ (manufactured by AM). In the printing, a PS treating agent EU-3 (manufactured by Fuji Photo Film) diluted 50-fold with distilled water was introduced as dampening water into a dampening water receiver and a varnish-containing magenta ink for offset printing was employed. The printed image on the 10th copy was evaluated by examining background fog and solid homogeneity in the image parts with the naked eye through a magnifying lens (×20). As a result, it was found that highly favorable image qualities were thus established.

Moreover, more than 10,000 copies each having an image showing a high homogeneity without any drop-off in thin lines and fine characters in the solid parts and substantially being free from any ink stains in the non-image parts were obtained.

Namely, the printing plate precursor according to the present invention makes it possible to provide a large number of excellent copies.

Example 11

<Production of Lithographic Printing Plate Precursor>

The following composition 2-1 was dispersed together with glass beads in a paint shaker (manufactured by Toyoseiki) at room temperature for 10 minutes. Then 33 g of the composition 2—2 was added and the resultant mixture was dispersed in a paint shaker (manufactured by Toyoseiki) at room temperature for additional 1 minute. After filtering off the glass beads, a dispersion was obtained.

| | |
|---|---|
| (Composition 2-1) | |
| Porous filler; Alumna RK30 (manufactured by Iwatani Kagaku Kogyo, average diameter 0.6 μm, average specific surface area 300 $m^2/g$) | 31 g |
| Hydrophilic polymer (Compound I-1) as 5 wt % aqueous solution | 70 g |
| Colloidal silica as 20% aqueous solution; Snowtex C (manufactured by Nissan Chemical Industries) | 60 g |
| (Composition 2-2) | |
| Tetraethoxysilane | 92 g |
| Ethanol | 163 g |
| Water | 163 g |
| Nitric acid | 0.1 g |

To the substrate (Bekk smoothness in the under side: 1000 (sec/10 cc)) of an ELP-1X master (manufactured by Fuji Photo Film) employed as an electrophotogrqaphic lithographic printing plate precursor in the field of rough printing, the above-described image receiving layer composition was applied with a wire bar in such a manner as to give a coating dose after drying of 5 $g/m^2$. Then it was dried in an oven at 100° C. for 10 minutes.

The smoothness of the lithographic printing plate precursor, which was measured by using a Bekk smoothness test machine (manufactured by Kumagai Riko) at an air volume of 10 cc, was 205 (sec/10 cc). Further, the surface contact angle of the lithographic printing plate precursor after 30 seconds, which was measured by putting 2 μl of distilled water on the surface of the lithographic printing plate precursor and using a surface contact angle meter (CA-D™, manufactured by Kyowa Kaimen Kagaku), was 5° or less.

The lithographic printing plate precursor as described above was employed in plate making by using a laser printer AMSI 1200-J Plate Setter™ marketed as AM-Straight Imaging System with the use of a dry toner.

When the copied image on the plate thus obtained was examined with the naked eye via a magnifying lens (×20), the plate showed favorable image qualities. Namely, the plate according to the present invention thus obtained by dry toner transfer from the laser printer was a favorable one without suffering from any problem in practical use, i.e., being free from any drop-off of thin lines or fine letters and homogenous in the solid parts and showing no irregular toner transfer and little background fog in the non-image parts due to flying toner.

Next, the above-described lithographic printing plate precursor was subjected to the same plate making procedure as the one described above and then employed in printing by using a full-automated printer AM-2850™ (manufactured by AM). In the printing, a PS treating agent EU-3 (manufactured by Fuji Photo Film) diluted 50-fold with distilled water was introduced as dampening water into a dampening water receiver and a varnish-containing magenta ink for offset printing was employed. The printed image on the 10th copy was evaluated by examining background fog and solid homogeneity in the image parts with the naked eye through a magnifying lens (×20). As a result, it was found that highly favorable image qualities were thus established.

Moreover, more than 10,000 copies each having an image showing a high homogeneity without any drop-off in thin lines and fine characters in the solid parts and substantially being free from any ink stains in the non-image parts were obtained.

Namely, the printing plate precursor according to the present invention makes it possible to provide a large number of excellent copies.

Comparative Example 2

A lithographic printing plate precursor was produced as in EXAMPLE 2-1 but using PVA217 (manufactured by Kuraray) as a substitute for the hydrophilic polymer according to the present invention (Compound I-1).

The obtained printing plate precursor had a surface Bekk smoothness of 160° (sec/10 cc) and a contact angle with water of 50 or less.

This printing plate precursor was subjected to the same plate making procedure as in EXAMPLE 11 and printing was carried out. Although the resultant plate showed favorable image qualities comparable to EXAMPLE 11 with little flying toner in the non-image parts, the copies showed stains in the non-image parts immediately after starting.

Example 12

<Production of Lithographic Printing Plate Precursor>

The following composition 2–3 was dispersed together with glass beads in a paint shaker (manufactured by Toyoseiki) at room temperature for 10 minutes. Then 33 g of the composition 2–4 was added and the resultant mixture was dispersed in a paint shaker (manufactured by Toyoseiki) at room temperature for additional 1 minute. After filtering off the glass beads, a dispersion was obtained.

| (Composition 2-3) | |
|---|---|
| Porous filler; Alumna RH30 (manufactured by Iwatani Kagaku Kogyo, average diameter 1.5 μm, average specific surface area 50 $m^2$/g) | 31 g |
| Rutile type titanium oxide (manufactured by Wako Pure Chemical Industries, average diameter 0.3 μm) | 11 g |
| Hydrophilicpolymer (Compound I-5) as 5 wt % aqueous solution | 70 g |
| Colloidal silica as 20% aqueous solution; Snowtex C (manufactured by Nissan Chemical Industries) | 60 g |
| (Composition 2-4) | |
| Tetraethoxysilane | 92 g |
| Ethanol | 163 g |
| Water | 163 g |
| Nitric acid | 0.1 g |

To the substrate (Bekk smoothness in the under side: 2000 (sec/10 cc) or more) of an ELP-1X master (manufactured by Fuji Photo Film) employed as an electrophotogrqaphic lithographic printing plate precursor in the field of rough printing, the above-described composition was applied with a wire bar in such a manner as to give a coating dose after drying of 6 g/$Mm^2$. After drying to touch, it was further dried at 110° C. for 30 minutes to give a lithographic printing plate precursor. The smoothness of the obtained lithographic printing plate precursor was 1000 (sec/10 cc), while its contact angle with water was 50 or less.

<Production of Electrophotographic Sensitive Material>

A mixture of 2 g of X type nonmetallic phthalocyanin (manufactured by Dainippon Ink and Chemicals), 14.4 g of the binder resin (P-1) shown above, 3.6 g of the binder resin (P-2) shown above, 0.15 g of the compound (A) shown above and 80 g of cyclohexanone was introduced together with glass beads into a 500 ml glass container and dispersed in a paint shaker (manufactured by Toyoseiki Seisakusho) for 60 minutes. Then the glass beads were filtered off to give a sensitive layer dispersion.

Next, this dispersion was applied with a wire bar onto a degreased aluminum plate of 0.2 mm in thickness. After drying to touch, it was heated in a circulatory oven at 110° C. for 20 seconds. The sensitive layer thus obtained had a film thickness of 8 μm.

The electrophotographic sensitive material thus produced was corona-charged in a dark place to give a surface potential of +450V. Based on the data which had been read from an original copy with a color scanner, subjected to color separation, corrected to reproduce some colors characteristic to the system and then stored as digital image data in a hard disk in the system, the sensitive material was then exposed to light of 788 mm with the use of a semiconductor laser drawer as an exposure apparatus at a beam spot diameter of 15 μm, a pitch of 10 μm and a scan speed of 300 cm/sec (i.e., 2500 dpi). The exposure was carried out in such a manner as to give an exposure dose on the sensitive material of 25 erg/$cm^2$.

Subsequently, it was developed with the developing solution as will be shown hereinafter and stains in the non-image parts were removed by rinsing in a bath of Isoper G alone. Next, it was dried with a hot air stream giving a surface temperature of the sensitive material of 50° C. until the content of Isoper G reached 10 mg/g of the toner. Subsequently, this sensitive material was precharged at −6 KV with a corona charging device. The image face of the sensitive material was piled on the above-described lithographic printing plate precursor and the image was transferred by negative corona discharge from the electrophotographic sensitive material side.

<Developing Solution>

The following components were kneaded in a kneader at 95° C. for 2 hours to give a mixture. After cooling in the kneader, this mixture was ground in the kneader too. One part by weight of this ground material and 4 parts by weight of Isoper H were dispersed in a paint shaker for 6 hours to give a dispersion. This dispersion was diluted with Isoper G so as to give a toner solid content of 1 g/l. At the same time, basic barium petronate was added as a charge controller for imparting negative charge to give a content of 0.1 g/l. Thus, a developing solution was prepared.

| (Composition for kneading) | |
|---|---|
| Ethylene-methacrylic acid copolymer (Nucrel N-699 manufactured by Du Pont-Mitsui) | 4 parts by weight |
| Carbon black #30 (manufactured by Mitsubishi Chemical Industries) | 1 part by weight |
| Isoper L (manufactured by Exon) | 15 parts by weight |

The lithographic printing plate precursor having the image thus formed was heated to 100° C. for 30 seconds to thereby completely fix the toner image parts.

The image drawn on the plate thus obtained was evaluated by observing under an optical microscope (×200). As a result, it was found out that the image was very clear without having any bleeding or drop-off in thin lines, fine characters, etc.

Using the printing plate thus formed, printing was carried out with a printer (Model Oliver 94 manufactured by Sakurai Seisakusho). In the printing, SLM-OD (manufactured by Mitsubishi Paper Mills) diluted 100-fold with distilled water was introduced as dampening water into a dampening water receiver and a varnish-containing magenta ink for offset printing was employed.

The printed image on the 10th copy was evaluated with the naked eye through a magnifying lens (×20). As a result, no background stain due to the deposition of the printing ink was observed in the non-image parts and the solid image parts showed a high homogeneity. When further examined under an optical microscope (×200), favorable image qualities were observed without any thinning, drop-off, etc. in thin lines and fine characters. More than 10,000 copies having comparable image qualities could be obtained.

Example 13

<Production of Waterproof Substrate>

Using a woodfree paper of 100 $g/m^2$ in weight as a base material, a back layer coating of the following composition was applied to one face of the base material with a wire bar to form a back layer having a dry coating dose of 12 $g/m^2$. Then it was calendered to give a smoothness of the back layer of about 100 (sec/10 ml).

| (Coating for back layer) | |
|---|---|
| Kaolin (50% aqueous dispersion) | 200 parts |
| Aqueous polyvinyl alcohol solution (10%) | 60 parts |
| SBR latex (solid content 50%, Tg: 0° C.) | 100 parts |
| Melamine resin (solid content 80%, Sumirez Resin SR-613) | 5 parts |

Next, an under layer coating of the following composition was applied to the other face of the base material with a wire bar to form an under layer having a dry coating dose of 10 $g/m^2$. Then it was calendered to give a smoothness of the under layer of about 1500 (sec/10 ml).

| (Coating for under layer) | |
|---|---|
| Carbon black (30% aqueous dispersion) | 5.4 parts |
| Clay (50% aqueous dispersion) | 54.6 parts |
| SBR latex (solid content 50%, Tg: 25° C.) | 36 parts |
| Melamine resin (solid content 80%, Sumirez Resin SR-613) | 4 parts |

The above components were mixed together and water was added to give a total solid content of 25%, thereby preparing the under layer coating.

The intrinsic resistivity of the under layer thus obtained was measured in the following manner.

The under layer coating was applied on a sufficiently degreased stainless plate to give a coating film having a dry coating dose of 10 g/m . When measured by using the three-terminal method provided with a guard electrode in accordance with JIS K-6911, the intrinsic resistivity of the obtained sample was $4\times10^9$ Ω·cm.

The following composition 5 was dispersed together with glass beads in a paint shaker (manufactured by Toyoseiki) at room temperature for 10 minutes. Then 33 g of the composition 6 was added and the resultant mixture was dispersed in a paint shaker (manufactured by Toyoseiki) at room temperature for additional 1 minute. After filtering off the glass beads, a dispersion was obtained.

| (Composition 2-5) | |
|---|---|
| Porous filler; magnesium hydroxide (manufactured by Wako Pure Chemical Industries, average diameter 0.6 μm, average specific surface area 100 $m^2/g$) | 31 g |
| Hydrophilic polymer (Compound I-12) as 5 wt % aqueous solution | 70 g |
| Colloidal silica as 20% aqueous solution; Snowtex C (manufactured by Nissan Chemical Industries) | 60 g |
| (Composition 2-6) | |
| Tetramethoxysilane | 92 g |
| Ethanol | 163 g |
| Water | 163 g |
| Nitric acid | 0.1 g |

To the above-described waterproof substrate, this dispersion was applied with a wire bar in such a manner as to give a coating dose after drying of 6 $g/m^2$. Then it was dried in an oven at 100° C. for 20 minutes to give a lithographic printing plate precursor.

<Preparation of Oil-base Ink (IK-1)>

(Production of Resin Particles)

A liquid mixture of 14 g of poly(dodecyl methacrylate), 100 g of vinyl acetate, 4.0 g of octadecyl methacrylate and 286 g of Isoper H was heated to 70° C. while stirring under a nitrogen gas stream. As a polymerization initiator, 1.5 g of 2,2'-azobis(isovaleronitrile) (abbreviated as A.I.V.N.) was added thereto and the resultant mixture was reacted for 4 hours. Further, 0.8 g of 2,2'-azobis(isobutyronitrile) (abbreviated as A.I.B.N.) was added and the resultant mixture was heated to 80° C. and then reacted for 2 hours. Subsequently, 0.6 g of A.I.B.N. was added and the reaction was continued for 2 hours. Then the temperature was elevated to 100° C. and the mixture was stirred as such for 1 hour to distill off the unreacted monomers. After cooling and filtering through a 200-mesh nylon cloth, the obtained white dispersion was a latex having a degree of polymerization of 93% and an average particle diameter of 0.35 μm. The particle diameter was measured with CAPA-500 (manufactured by Horiba).

(Production of Ink)

10 g of a dodecyl methacrylate/acrylic acid copolymer (copolymerization ratio: 98/2 by weight), 10 g of Alkali Blue and 30 g of Shell Sol 71 were introduced into a paint shaker (manufactured by Toyoseiki) together with glass beads and dispersed for 4 hours. Thus a blue microdispersion of Alkali Blue was obtained.

50 g (on the solid basis) of the above-described resin particles, 5 g (on the solid basis) of the above-described blue dispersion and 0.06 g of zirconium naphthenate were diluted with 1 l of Isoper G to thereby give a blue oil-base ink (IK-1).

Using the printing plate precursor obtained above, printing was carried out with the use of the above-described oil-base ink (IK-1) by modifying a servo plotter DA8400 (manufactured by Graphtec) by which PC output can be drawn, attaching an inkjet head shown in FIG. 2 to a pen plotter unit and placing the lithographic printing plate precursor on a counter electrode located at an interval of 1.5 mm. In the plate making, the under layer formed immediately below the image receiving layer of the printing plate precursor was electrically connected to the counter electrode with the use of a silver paste.

The plate thus made was heated with a Richo Fuser (manufactured by Richo) controlled to give a plate face temperature of 70° C. for 10 seconds to thereby fix the ink image.

The image on the plate thus obtained was examined by observing under an optical microscope (×200). As a result, it was found out that a clear image free from any bleeding or drop-off in thin lines, fine characters, etc. could be thus obtained.

Using the printing plate thus formed, printing was carried out with a printer (Model Oliver 94 manufactured by Sakurai Seisakusho). In the printing, EU-3 (manufactured by Fuji Photo Film) diluted 100-fold with distilled water was introduced as dampening water into a dampening water receiver and a varnish-containing magenta ink for offset printing was employed.

The printed image on the 10th copy was evaluated with the naked eye through a magnifying lens (×20). As a result, no background stain due to the deposition of the printing ink was observed in the non-image parts and the solid image parts showed a high homogeneity. When further examined under an optical microscope (×200), favorable image qualities were observed without any thinning, drop-off, etc. in thin lines and fine characters. More than 10,000 copies having comparable image qualities could be obtained.

Examples 14 to 19

Lithographic printing plate precursors were produced as in EXAMPLE 13 but using the compounds listed in the following TABLE 2-1 as substitutes for the hydrophilic polymer (Compound I-12) employed in EXAMPLE 13.

TABLE 2-1

| Example | Hydrophilic polymer |
|---|---|
| Example 14 | Compound I-2 |
| Example 15 | Compound I-4 |
| Example 16 | Compound I-7 |
| Example 17 | Compound I-9 |
| Example 18 | Compound I-10 |
| Example 19 | Compound I-11 |

The surface Bekk smoothness of each of the printing plate precursors thus obtained fell within a range of from 800 to 1200 (sec/10 cc) while the contact angle with water was 5° or less. When a printing plate was produced and printing was carried out as in EXAMPLE 13, each of the obtained copies showed a clear image without any strain in the non-image parts, as in EXAMPLE 13. Also, a high printing tolerance (more than 10,000 copies) could be achieved.

Example 20

Using the lithographic printing plate precursor produced in EXAMPLE 13, plate making was performed with the use of Solid Inkjet Platemaker SJ120 (manufactured by Hitachi-Koki) which is a marketed inkjet plate maker with the use of solid inks.

When the copied image on the plate thus obtained was examined with the naked eye via a magnifying lens (×20), the plate showed favorable image qualities. Namely, the plate according to the present invention thus obtained by using the solid inkjet printer was a favorable one without suffering from any drop-off of thin lines or fine letters. It was homogenous in the solid parts and showed no background fog in the non-image parts due to flying toner.

Next, the above-described lithographic printing plate precursor was subjected to the same plate making procedure as the one described above and then employed in printing by using a full-automated printer AM-2850™ (manufactured by AM). In the printing, a PS treating agent EU-3 (manufactured by Fuji Photo Film) diluted 50-fold with distilled water was introduced as dampening water into a dampening water receiver and a varnish-containing magenta ink for offset printing was employed. The printed image on the 10th copy was evaluated by examining background fog and solid homogeneity in the image parts with the naked eye through a magnifying lens (×20). As a result, it was found that highly favorable image qualities were thus established.

Moreover, more than 10,000 copies each having an image showing a high homogeneity without any drop-off in thin lines and fine characters in the solid parts and substantially being free from any ink stains in the non-image parts were obtained.

Namely, the printing plate precursor according to the present invention makes it possible to provide a large number of excellent copies.

Using the lithographic printing plate precursor according to the present invention, an excellent image free from not only uniform background stains but also spotty stains can be obtained. Moreover, it becomes possible thereby to provide a large number of copies having a clear image without any drop-off, distortion, etc. in multiset printing.

This application is based on Japanese Patent application JP2001-317102, filed Oct. 15, 2001, and Japanese Patent application JP2001-317103, filed Oct. 15, 2001, the entire contents of which are hereby incorporated by reference, the same as if set forth at length.

What is claimed is:

1. A lithographic printing plate precursor comprising an image receiving layer and a waterproof substrate, wherein the image receiving layer comprises:

at least one filler comprising needle filler particles; and a binder resin comprising a complex of: a resin comprising at least one of a metal atom and a semimetal atom, each of the at least one of a metal atom and a semimetal atom being bonded to an oxygen atom; with a polymer compound represented by the following formula (I):

(I)

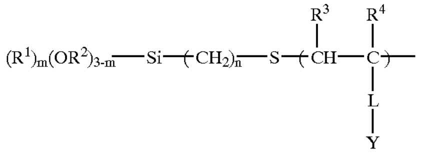

wherein $R^1$, $R^2$, $R^3$ and $R^4$ each independently represent a hydrogen atom or a hydrocarbon group having 1 to 8 carbon atoms; m is 0, 1 or 2; n is an integer of from 1 to 8; L represents a single bond or an organic linking group; and Y represents —$NHCOR^5$, —$CONH_2$, —$CON(R^5)_2$, —$COR^5$, —OH, —$CO_2M$ or —$SO_3M$ wherein $R^5$ represents an alkyl group having 1 to 8 carbon atoms, and M represents a hydrogen atom, an alkali metal, an alkaline earth metal or an onium.

2. A lithographic printing plate precursor comprising an image receiving layer and a waterproof substrate, wherein the image receiving layer comprises:

at least one filler comprising porous filler particles; and a binder resin comprising a complex of: a resin comprising at least one of a metal atom and a semimetal atom, each of the at least one of a metal atom and a semimetal atom being bonded to an oxygen atom; with a polymer compound represented by the following formula (I):

(I)

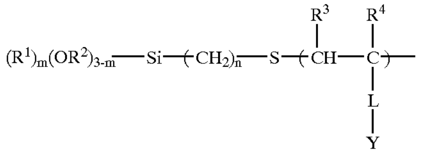

wherein $R^1$, $R^2$, $R^3$ and $R^4$ each independently represent a hydrogen atom or a hydrocarbon group having 1 to 8 carbon atoms; m is 0, 1 or 2; n is an integer of from 1 to 8; L represents a single bond or an organic linking group; and Y represents —$NHCO^5$, —$CONH_2$, —$CON(R^5)_2$, —$COR^5$, —OH, —$CO_2M$ or —$SO_3M$ wherein $R^5$ represents an alkyl group having 1 to 8 carbon atoms, and M represents a hydrogen atom, an alkali metal, an alkaline earth metal or an onium.

3. The lithographic printing plate precursor according to claim 1, wherein the needle filler particles have an average diameter of 3 μm or less and an average length of 100 μm or less.

4. The lithographic printing plate precursor according to claim 1, wherein a content of the needle filler particles is 25% by weight or more to that of the total amount of filler contained in the image receiving layer.

5. The lithographic printing plate precursor according to claim 1, wherein a mixing ratio by weight of the binder resin to the total amount of filler in the image receiving layer is from 80:20 to 5:95.

6. The lithographic printing plate precursor according to claim 1, wherein the resin is a polymer obtained by hydrolytic cocondensation of at least one compound represented by the following formula (II):

$$(R^{10})_xM^{10}(G)_{z-x} \quad \text{(II)}$$

wherein $R^{10}$ represents a hydrogen atom, a hydrocarbon group or a heterocyclic group; G represents a reactive group; $M^{10}$ represents a 3- to 6-valent metal or semimetal; z represents a valency of metal or semimetal represented by $M_{10}$; and x is 0, 1, 2, 3 or 4, provided that z-x is 2 or more.

7. The lithographic printing plate precursor according to claim 2, wherein an average pore diameter of the porous filler is from 1 Å to 1 μm.

8. The lithographic printing plate precursor according to claim 2, wherein an average specific surface area of the porous filler is from 0.05 $m^2/g$ to 5000 $m^2/g$.

9. The lithographic printing plate precursor according to claim 2, wherein a mixing ratio by weight of the binder resin to the total amount of filler in the image receiving layer is from 80:20 to 5:95.

10. The lithographic printing plate precursor according to claim 2, wherein the resin is a polymer obtained by hydrolytic cocondensation of at least one compound represented by the following formula (II):

$$(R^{10})_xM^{10}(G)_{z-x} \quad \text{(II)}$$

wherein $R^{10}$ represents a hydrogen atom, a hydrocarbon group or a heterocyclic group; G represents a reactive group; $M^{10}$ represents a 3- to 6-valent metal or semimetal; represents a valency of metal or semimetal represented by $M^{10}$; and x is 0, 1, 2, 3 or 4, provided that z-x is 2 or more.

* * * * *